US012794628B2

(12) United States Patent
Huang et al.

(10) Patent No.: US 12,794,628 B2
(45) Date of Patent: Nov. 10, 2026

(54) REFERENCE SIGNAL BUNDLING ENHANCEMENTS

(71) Applicant: QUALCOMM Incorporated, San Diego, CA (US)

(72) Inventors: Yi Huang, San Diego, CA (US); Alexandros Manolakos, Escondido, CA (US); Wanshi Chen, San Diego, CA (US); Wei Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 718 days.

(21) Appl. No.: 17/757,558

(22) PCT Filed: Dec. 15, 2020

(86) PCT No.: PCT/US2020/065169

§ 371 (c)(1),
(2) Date: Jun. 16, 2022

(87) PCT Pub. No.: WO2021/126887

PCT Pub. Date: Jun. 24, 2021

(65) Prior Publication Data

US 2023/0017463 A1 Jan. 19, 2023

(30) Foreign Application Priority Data

Dec. 19, 2019 (GR) .............................. 20190100566

(51) Int. Cl.
*H04L 5/00* (2006.01)
*H04L 25/02* (2006.01)

(52) U.S. Cl.
CPC ........ *H04L 5/0051* (2013.01); *H04L 25/0224* (2013.01)

(58) Field of Classification Search
CPC .......................... H04L 5/0051; H04L 25/0224
See application file for complete search history.

(56) References Cited

U.S. PATENT DOCUMENTS

| | | | | |
|---|---|---|---|---|
| 8,108,757 B2 * | 1/2012 | Ahn | H04L 5/0055 | 714/776 |
| 2010/0271999 A1 * | 10/2010 | Yu | H04L 1/18 | 370/312 |

(Continued)

OTHER PUBLICATIONS

Huawei et al., “Design of DMRS for DL/UL Data Transmission”, 3GPP Draft, 3GPP TSG RAN WG1 Meeting AH NR#3, R1-1715472, 3rd Generation Partnership Project (3GPP), Mobile Competence Centre, 650, Route Des Lucioles, F-06921 Sophia-Antipolis Cedex, France, vol. RAN WG1, No. Nagoya, Japan, Sep. 18, 2017-Sep. 21, 2017, Sep. 17, 2017, XP051338940, Retrieved from the Internet: URL: http://www.3gpp.org/ftp/Meetings_3GPP_SYNC/RAN1/Docs/ [retrieved on Sep. 17, 2017], 16 pages.

(Continued)

*Primary Examiner* — Jasper Kwoh
(74) *Attorney, Agent, or Firm* — Harrity & Harrity, LLP

(57) ABSTRACT

Methods, systems, and devices for wireless communication are described. A wireless device may receive bundling indicators for a plurality of downlink transmissions and corresponding downlink assignment indicators associated with the bundling indicators, determine a demodulation reference signal (DMRS) bundling configuration based on the bundling indicators and the corresponding downlink assignment indicators, and process demodulation reference signals according to the DMRS bundling configuration. A wireless device may also receive bundling indicators for a plurality of downlink transmissions, determine a demodulation reference signal (DMRS) bundling configuration based on the bundling indicators and a gap between successive transmissions of the plurality of downlink transmis- (Continued)

sions, and process demodulation reference signals according to the DMRS bundling configuration.

20 Claims, 13 Drawing Sheets

(56) References Cited

U.S. PATENT DOCUMENTS

2011/0280164 A1* 11/2011 Luo ........................ H04L 5/0053 370/281
2015/0003425 A1* 1/2015 Kim ........................ H04L 5/0055 370/336
2016/0065341 A1* 3/2016 Yoo ...................... H04L 25/0224 370/336
2018/0145809 A1 5/2018 Kwak et al.
2018/0323907 A1* 11/2018 Takeda .................. H04L 1/1864
2019/0053071 A1 2/2019 Ly
2019/0261338 A1 8/2019 Akkarakaran et al.
2020/0120584 A1* 4/2020 Yi ..................... H04W 74/0833
2021/0184812 A1* 6/2021 MolavianJazi ....... H04W 72/23

OTHER PUBLICATIONS

International Search Report and Written Opinion—PCT/US2020/065169—ISA/EPO—Apr. 8, 2021.

Samsung: "Discussion on RB Bundling for DM-RS", 3GPP Draft, 3GPP TSG RAN WG1 Meeting #60bis, R1-102187, RB Bundling, 3rd Generation Partnership Project (3GPP), Mobile Competence Centre, 650, Route Des Lucioles, F-06921 Sophia-Antipolis Cedex, France, vol. RAN WG1, No. Beijing, china, Apr. 12, 2010, Apr. 6, 2010 (Apr. 6, 2010), XP050419467, pp. 1-5.

* cited by examiner

REFERENCE SIGNAL BUNDLING ENHANCEMENTS

CROSS-REFERENCE TO RELATED APPLICATIONS

The present application is a 35 U.S.C. § 371 National Phase entry of International Patent Application No. PCT/US2020/065169 filed on Dec. 15, 2020, which claims priority to Greek Patent Application No. 20190100566, entitled "REFERENCE SIGNAL BUNDLING ENHANCEMENTS"and filed on Dec. 19, 2019. Each aforementioned application is hereby incorporated by reference in its entirety for all purposes.

CLAIM OF PRIORITY

This application claims benefit to Greece Patent Application Serial No. 20190100566, entitled "REFERENCE SIGNAL BUNDLING ENHANCEMENTS", filed Dec. 19, 2019, and assigned to the assignee hereof, the contents of which are hereby incorporated by reference in its entirety.

BACKGROUND

The following relates to wireless communication and reference signal bundling enhancements.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, or apparatuses that support random access uplink enhancements. A method of wireless communication is described. The method may include receiving bundling indicators for a plurality of downlink transmissions and corresponding downlink assignment indicators associated with the bundling indicators, determining a demodulation reference signal (DMRS) bundling configuration based on the bundling indicators and the corresponding downlink assignment indicators, and processing demodulation reference signals according to the DMRS bundling configuration.

An apparatus for wireless communication is described. The apparatus may include a processor, a memory coupled to the processor, and instructions stored in the memory. The instructions may be executable by the processor to cause the apparatus to receive bundling indicators for a plurality of downlink transmissions and corresponding downlink assignment indicators associated with the bundling indicators, determine a demodulation reference signal (DMRS) bundling configuration based on the bundling indicators and the corresponding downlink assignment indicators, and process demodulation reference signals according to the DMRS bundling configuration.

A non-transitory computer readable medium storing code for wireless communication is described. The code may include instructions executable by a processor to receive bundling indicators for a plurality of downlink transmissions and corresponding downlink assignment indicators associated with the bundling indicators, determine a demodulation reference signal (DMRS) bundling configuration based on the bundling indicators and the corresponding downlink assignment indicators, and process demodulation reference signals according to the DMRS bundling configuration.

Another apparatus for wireless communication is described. The apparatus may include means for receiving bundling indicators for a plurality of downlink transmissions and corresponding downlink assignment indicators associated with the bundling indicators, means for determining a demodulation reference signal (DMRS) bundling configuration based on the bundling indicators and the corresponding downlink assignment indicators, and means for processing demodulation reference signals according to the DMRS bundling configuration.

In some examples of the method, apparatuses, or non-transitory computer-readable medium described herein, the determining the DMRS bundling configuration comprises determining that demodulation reference signals associated with consecutive bundling indicators having a same value are to be handled as bundled downlink transmissions. Some examples of the method, apparatuses, or non-transitory computer-readable medium described herein may further include processes, features, means, or instructions for applying a same precoding scheme to demodulation reference signals handled as bundled downlink transmissions. Some examples of the method, apparatuses, or non-transitory computer-readable medium described herein may further include processes, features, means, or instructions for identifying a discontinuity in consecutive downlink assignment indicators. In some cases, determining the DMRS bundling configuration further comprises determining that demodulation reference signals associated with bundling indicators received after the discontinuity are not to be handled as bundled downlink transmissions with respect to demodulation reference signals associated with bundling indicators received prior to the discontinuity. In some cases, determining the bundled downlink transmissions is further based on identifying no discontinuity in the corresponding downlink assignment indicators.

A method of wireless communication is described. The method may include determining a bundling configuration for demodulation reference signals of a plurality of downlink transmissions, generating bundling indicators to indicate the bundling configuration to a user equipment (UE), transmitting the bundling indicators and corresponding downlink assignment indicators associated with the bundling indicators to the UE, and transmitting the demodulation reference signals according to the bundling configuration.

An apparatus for wireless communication is described. The apparatus may include a processor, a memory in electronic communication with the processor, and instructions stored in the memory. The instructions may be executable by the processor to cause the apparatus to determine a bundling configuration for demodulation reference signals of a plurality of downlink transmissions, generate bundling indicators to indicate the bundling configuration to a user equipment (UE), transmit the bundling indicators and corresponding downlink assignment indicators associated with the bundling indicators to the UE, and transmit the demodulation reference signals according to the bundling configuration.

A non-transitory computer readable medium storing code for wireless communication is described. The code may include instructions executable by a processor to determine a bundling configuration for demodulation reference signals of a plurality of downlink transmissions, generate bundling indicators to indicate the bundling configuration to a user equipment (UE), transmit the bundling indicators and corresponding downlink assignment indicators associated with the bundling indicators to the UE, and transmit the demodulation reference signals according to the bundling configuration.

Another apparatus for wireless communication is described. The apparatus may include means for determining a bundling configuration for demodulation reference signals of a plurality of downlink transmissions, means for generating bundling indicators to indicate the bundling configuration to a user equipment (UE), means for transmitting the bundling indicators and corresponding downlink assignment indicators associated with the bundling indicators to the UE, and means for transmitting the demodulation reference signals according to the bundling configuration.

A method of wireless communication is described. The method may include receiving bundling indicators for a plurality of downlink transmissions, determining a demodulation reference signal (DMRS) bundling configuration based on the bundling indicators and a gap between successive transmissions of the plurality of downlink transmissions, and processing demodulation reference signals according to the DMRS bundling configuration.

An apparatus for wireless communication is described. The apparatus may include a processor, a memory in electronic communication with the processor, and instructions stored in the memory. The instructions may be executable by the processor to cause the apparatus to receive bundling indicators for a plurality of downlink transmissions, determine a demodulation reference signal (DMRS) bundling configuration based on the bundling indicators and a gap between successive transmissions of the plurality of downlink transmissions, and process demodulation reference signals according to the DMRS bundling configuration.

A non-transitory computer readable medium storing code for wireless communication is described. The code may include instructions executable by a processor to receive bundling indicators for a plurality of downlink transmissions, determine a demodulation reference signal (DMRS) bundling configuration based on the bundling indicators and a gap between successive transmissions of the plurality of downlink transmissions, and process demodulation reference signals according to the DMRS bundling configuration.

Another apparatus for wireless communication is described. The apparatus may include means for receiving bundling indicators for a plurality of downlink transmissions, means for determining a demodulation reference signal (DMRS) bundling configuration based on the bundling indicators and a gap between successive transmissions of the plurality of downlink transmissions, and means for processing demodulation reference signals according to the DMRS bundling configuration.

A method of wireless communication is described. The method may include receiving an indication of a level of bundling supported by a user equipment (UE), determining a threshold number of orthogonal frequency division multiplexing (OFDM) symbols based on the level of bundling supported by the UE, determining a bundling configuration for demodulation reference signals of a plurality of downlink transmissions, generating bundling indicators to indicate the bundling configuration to the UE, transmitting the bundling indicators and the threshold number of OFDM symbols to the UE, and transmitting the demodulation reference signals according to the bundling configuration.

An apparatus for wireless communication is described. The apparatus may include a processor, a memory in electronic communication with the processor, and instructions stored in the memory. The instructions may be executable by the processor to cause the apparatus to receive an indication of a level of bundling supported by a user equipment (UE), determine a threshold number of orthogonal frequency division multiplexing (OFDM) symbols based on the level of bundling supported by the UE, determine a bundling configuration for demodulation reference signals of a plurality of downlink transmissions, generate bundling indicators to indicate the bundling configuration to the UE, transmit the bundling indicators and the threshold number of OFDM symbols to the UE, and transmit the demodulation reference signals according to the bundling configuration.

Another apparatus for wireless communication is described. The apparatus may include means for receiving an indication of a level of bundling supported by a user equipment (UE), means for determining a threshold number of orthogonal frequency division multiplexing (OFDM) symbols based on the level of bundling supported by the UE, means for determining a bundling configuration for demodulation reference signals of a plurality of downlink transmissions, means for generating bundling indicators to indicate the bundling configuration to the UE, means for transmitting the bundling indicators and the threshold number of OFDM symbols to the UE, and means for transmitting the demodulation reference signals according to the bundling configuration.

DETAILED DESCRIPTION

Figure 1:
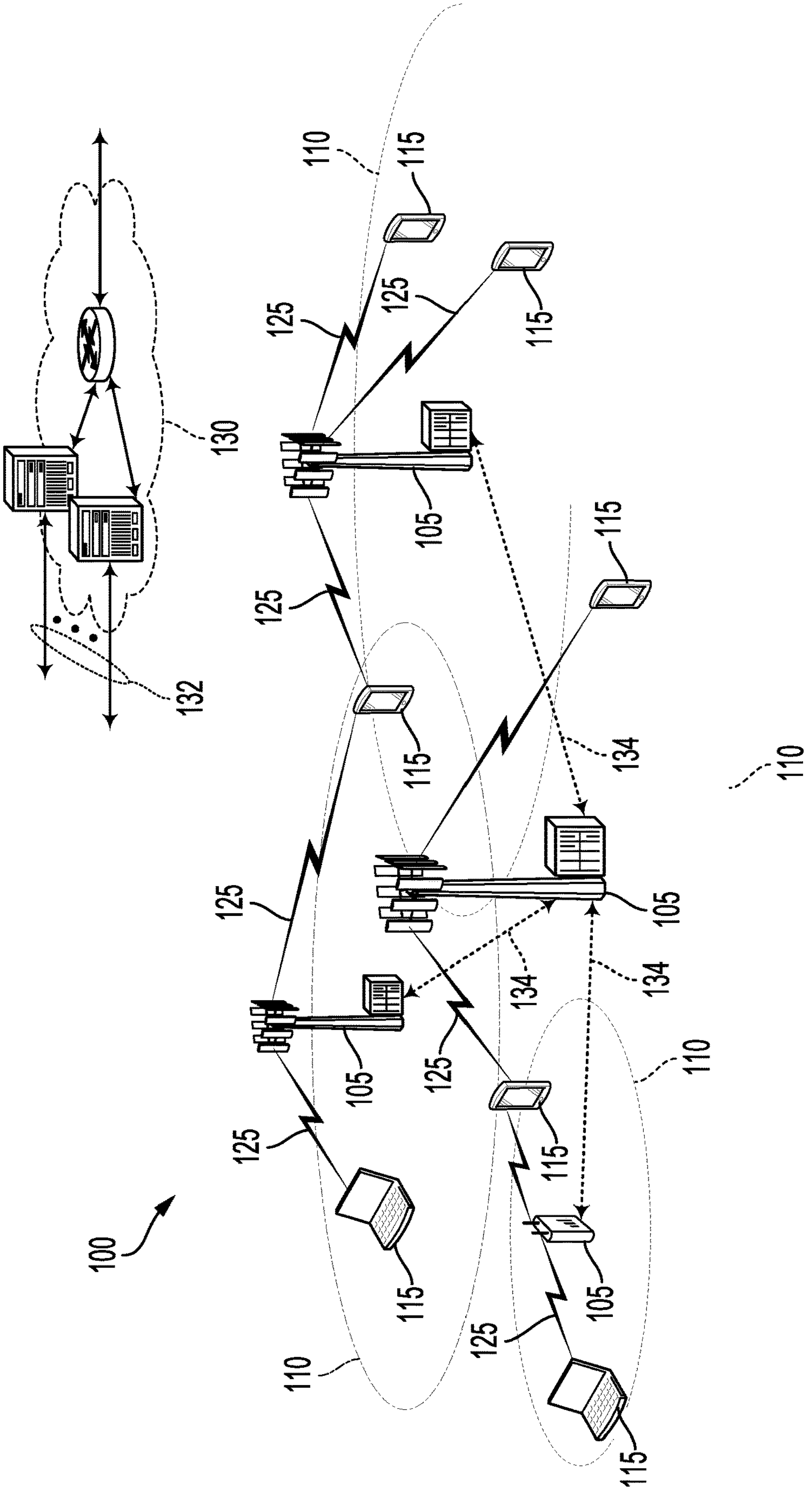
FIG. 1 illustrates an example of a system for wireless communication that supports reference signal bundling enhancements in accordance with aspects of the present disclosure.

In various deployments of wireless communications, including 5G New Radio (NR), for example, a base station and a user equipment (UE) may transmit and receive various reference signals associated with data transmissions, such as demodulation reference signals (DMRSs). A DMRS may include, for example, a reference signal communicated with a data transmission (either downlink, uplink, or sidelink). A DMRS may be communicated using a DMRS pattern, where the DMRS pattern may include a set of parameters defining a resource allocation of time, frequency, and spectral resources for the DMRSs, a multiplexing scheme and/or an antenna port mapping for the DMRSs in the frequency, time, and code domain, a scrambling code to be applied to the DMRSs, and the like. The UE may use DMRSs to estimate channel characteristics (e.g., via channel quality measurements) of the channel or channels on which the base station and the UE communicate data. The UE may then use the estimated channel characteristics to perform demodulation and/or decoding of transmissions communicated over the estimated channel.

In some cases, a UE may bundle the DMRS of one or more received data transmission (e.g., two subsequent downlink data transmissions) from the base station based on a new bundling indicator (NBI). When a UE performs DMRS bundling, the base station may configure parameters that are common across a bundle of time resources (e.g., transmission time intervals (TTIs)), such as a common precoding, to coherently transmit the DMRSs in each of the TTIs of each respective bundle on an antenna port. Accordingly, the UE may assume that a common precoder is used to transmit the DMRSs across some or all of the data channels of each bundle. In this way, the UE may coherently filter the received DMRSs to improve the accuracy of its channel estimation procedures by jointly processing the DMRSs received in each bundle.

The UE may determine to bundle or not bundle the reference signals (e.g., DMRS) of data transmissions using the NBI received from the base station. The NBI may be transmitted via control signaling (e.g., downlink control information (DCI)) to the UE. For example, a single bit of the DCI may be used to dynamically indicate the relation of a current precoding scheme with respect to a previous precoding scheme. For example, the bit may indicate if the current precoding scheme is the same as a previous precoding scheme, or the bit may indicate that the current precoding scheme is different than the previous precoding scheme. In some cases, the precoding scheme may not change often, and the use of a single bit NBI may allow for more efficient processing compared to a bundling indication that includes multiple bits to indicate if bundling may occur and separately indicate the resources that the bundling indication may apply to (e.g., do not bundle with previous resource and bundle with next resource).

In some examples, the NBI comprises a DCI bit that may indicate that the current precoding scheme (e.g., the precoding scheme for the DMRS received in the downlink transmission associated with the DCI) is the same as a previous precoding scheme (e.g., a precoding scheme for the DMRS received in a previous downlink transmission). That is, the DMRS received in the current downlink transmission should be bundled with the DMRS received in the previous downlink transmission if the NBI bits associated with the two downlink transmissions are the same. On the other hand, the DMRS received in the current downlink transmission is not bundled with the DMRS received in the previous downlink transmission if the NBI bits are different. Accordingly, the "toggling" of the NBI bit may indicate to a UE whether or not to bundle the DMRS transmissions of respective downlink transmissions.

However, in some instances, a UE may fail to correctly receive or decode an NBI bit, which may result in incorrectly bundling DMRS transmissions that should not be bundled. For example, the base station may transmit toggled NBI bits to indicate to a UE that consecutive downlink transmissions should not be bundled. If the UE, however, misses the toggled NBI bits, the UE may incorrectly assume that consecutive downlink transmissions prior to and after the downlink transmission associated with the toggled NBI bit are to be bundled, when in fact, the base station does not intend to bundle those downlink transmissions.

As described in further detail in the present disclosure, in order to address the problem of a "missed" NBI bit, a UE may determine whether DMRS transmissions should be bundled based further on one or more parameters in addition to the NBI bit. For example, in certain instances, a base station may transmit a downlink assignment indicator (DAI) that may serve as a counter for each Physical Downlink Control Channel (PDCCH) transmitted. Accordingly, each PDCCH that schedules a corresponding Physical Downlink Shared Channel (PDSCH) transmission may include both an NBI bit as well as a DAI. If the UE receives a subsequent PDCCH having a DAI that is not sequentially higher than the DAI received in the prior PDCCH, the UE may assume that one or more PDCCH transmissions may have been missed. As such, the UE may determine not to bundle DMRS transmissions scheduled by the subsequent PDCCH with DMRS transmissions scheduled by the prior PDCCH, even if the NBI bits associated with both PDCCH are the same value. As disclosed further herein, the UE may determine the DMRS bundling configuration based on other factors. For example, the UE may determine whether a gap between scheduled PDSCH transmissions exceeds a particular threshold. If the gap exceeds the threshold, the UE may assume that a PDCCH transmission scheduling a PDSCH transmission was not received correctly. The UE may then determine that DMRS transmissions received prior to the gap are not to be bundled with DMRS transmissions received after the gap.

Aspects of the disclosure are initially described in the context of a wireless communications system. Aspects of the disclosure are further illustrated by and described with reference to apparatus diagrams, system diagrams, and flowcharts that relate to support for single-code communications. The detailed description set forth below, in connection with the appended drawings and appendix, is intended as a description of various configurations and is not intended to limit the scope of the disclosure. Rather, the detailed description includes specific details for the purpose of providing a thorough understanding of the present disclosure. It will be apparent to those skilled in the art that these specific details are not required in every case and that, in some instances, well-known structures and components are shown in block diagram form for clarity of presentation.

This disclosure relates generally to enhancements for reference signal bundling indication. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5G NR networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP Long Term Evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of a new radio (NR) technology. The 5G NR will be capable of scaling to provide coverage (1) to a massive Internet of things (IoTs) with an ultra-high density (e.g., ~1M nodes/km2), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km2), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth, for example. For other various indoor wideband implementations, using a TDD over the unlicensed portion of the 5 GHz band, the subcarrier spacing may occur with 60 kHz over a 160 MHz bandwidth, for example. Finally, for various deployments transmitting with mmWave components at a TDD of 28 GHz, subcarrier spacing may occur with 120 kHz over a 500 MHz bandwidth, for example. Other deployments of different subcarrier spacing over different bandwidths are also within the scope of the present disclosure.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs may allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 illustrates an example of a wireless communications system 100 that supports enhancements for reference signal bundling indication in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like. Each access network entity may communicate with UEs 115 through a number of other access network transmission entities, which may be referred to as a radio head, a smart radio head, a remote radio head, or a transmission/reception point (TRP). The functions performed by base stations 105 may be carried out via these network entities (e.g., TRPs). Accordingly, as described herein, the terms TRP, eNB, gNB, and base station may be used interchangeably unless otherwise noted.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), ultra-reliable low-latency communications (URLLC), NR-Light, or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, NR-Light device, or an MTC device, or the like, which may be implemented in various articles such as appliances, vehicles, meters, or the like. In some implementations, such as in factory automation settings and as used in certain examples herein, a UE 115 may also refer to a sensor/actuator (S/A) unit 115 that communicates with a programmable logic controller (PLC) that acts as a TRP 105 or base station 105.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention or with minimal human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130). In some examples, base stations 105 or TRPs 105 may communicate with each other through backhaul links 134 to coordinate transmission and reception of signals with UEs 115. For example, a first base station 105 may determine from CSI reports that transmissions from a neighboring base station 105 are negatively interfering with communications between the first base station 105 and the UE 115. Accordingly, the first base station 105 may inform the neighboring base station 105 via backhaul links 134 of the interference or request that the neighboring base station 105 mute transmissions on certain resources or transmit on different resources.

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115 (e.g., for multiple-input multiple-output (MIMO) operations such as spatial multiplexing, or for directional beamforming). However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ LTE License Assisted Access (LTE-LAA) or LTE-Unlicensed (LTE-U) radio access technology or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band. Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some cases, the antennas of a base station 105 or UE 115 may be located within one or more antennas or antenna arrays, which may support MIMO operations such as spatial multiplexing, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

MIMO wireless systems use a transmission scheme between a transmitting device (e.g., a base station 105) and a receiving device (e.g., a UE 115), where both transmitting device and the receiving device are equipped with multiple antennas. MIMO communications may employ multipath signal propagation to increase the utilization of a radio frequency spectrum band by transmitting or receiving different signals via different spatial paths, which may be referred to as spatial multiplexing. The different signals may, for example, be transmitted by the transmitting device via different antennas or different combinations of antennas. Likewise, the different signals may be received by the receiving device via different antennas or different combinations of antennas. Each of the different signals may be referred to as a separate spatial stream, and the different antennas or different combinations of antennas at a given device (e.g., the orthogonal resource of the device associated with the spatial dimension) may be referred to as spatial layers.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a direction between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain phase offset, timing advance/delay, or amplitude adjustment to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple use antennas or antenna arrays to conduct beamforming operations for directional communications with a UE 115. For instance, signals may be transmitted multiple times in different directions, which may include a signal being transmitted according to different beamforming weight sets associated with different directions of transmission. A receiving device (e.g., a UE 115, which may be an example of a mmW receiving device) may try multiple receive beams when receiving various signals from the base station 105, such as synchronization signals or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of Ts=1/30,720,000 seconds. Time intervals of a communications resource may be organized according to radio frames each having a duration of 10 milliseconds (Tf=307200*Ts). The radio frames may be identified by a system frame number (SFN) ranging from 0 to 1023. Each frame may include ten subframes numbered from 0 to 9, and each subframe may have a duration of 1 millisecond. A subframe may be further divided into two slots each having a duration of 0.5 milliseconds, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In 5G NR deployments, a radio frame may have a duration of 10 ms, and one slot may comprise 14 OFDM symbols, but the number of slots in a 5G NR radio frame may vary due to flexible numerology resulting in a flexible time-slot structure. In particular, the numerology for 5G NR may include sub-carrier spacings of 15 kHz, 30 kHz, 60 kHz, or 120 kHz, depending on the system configuration and bandwidth. For example, with increased sub-carrier spacing, the symbol duration decreases while the radio frame duration would remain the same. Accordingly, if the sub-carrier spacing is increased from 15 kHz to 30 kHz, the duration of each slot is halved, resulting in 20 slots within the 10 ms radio frame.

In some wireless communications systems, a slot may further be divided into multiple mini-slots containing one or more symbols and, in some instances, a symbol of a mini-slot or a mini-slot may be the smallest unit of scheduling. In some deployments, such as in 5G NR, each symbol may vary in duration depending on the subcarrier spacing or frequency band of operation, for example. Some wireless communications systems may implement slot aggregation in which multiple slots or mini-slots may be aggregated together for communication between a UE 115 and a base station 105.

A resource element may consist of one symbol period (e.g., a duration of one modulation symbol) and one subcarrier (e.g., a 15 kHz frequency range). A resource block may contain 12 consecutive subcarriers in the frequency domain (e.g., collectively forming a "carrier") and, for a normal cyclic prefix in each orthogonal frequency-division multiplexing (OFDM) symbol, 7 consecutive OFDM symbol periods in the time domain, or 84 total resource elements across the frequency and time domains. The number of bits carried by each resource element may depend on the modulation scheme (the configuration of modulation symbols that may be applied during each symbol period). Thus, the more resource elements that a UE 115 receives and the higher the modulation scheme (e.g., the higher the number of bits that may be represented by a modulation symbol according to a given modulation scheme), the higher the data rate may be for the UE 115. In MIMO systems, a wireless communications resource may refer to a combination of a radio frequency spectrum band resource, a time resource, and a spatial resource (e.g., spatial layers), and the use of multiple spatial layers may further increase the data rate for communications with a UE 115.

The term "carrier" refers to a set of radio frequency spectrum resources having a defined organizational structure for supporting uplink or downlink communications over a communication link 125. For example, a carrier of a communication link 125 may include a portion of a radio frequency spectrum band that may also be referred to as a frequency channel. In some examples a carrier may be made up of multiple sub-carriers (e.g., waveform signals of multiple different frequencies). A carrier may be organized to include multiple physical channels, where each physical channel may carry user data, control information, or other signaling.

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, or 20 MHz for LTE). In 5G NR, the carrier bandwidth may range from 5 MHz up to 100 MHz for sub-6 GHz frequency spectrum, and from 50 MHz up to 400 MHz for mmW frequency spectrum (above 24 GHz frequency spectrum). In some examples the system bandwidth may refer to a minimum bandwidth unit for scheduling communications between a base station 105 and a UE 115. In other examples a base station 105 or a UE 115 may also support communications over carriers having a smaller bandwidth than the system bandwidth. In such examples, the system bandwidth may be referred to as "wideband" bandwidth and the smaller bandwidth may be referred to as a "narrowband" bandwidth. In some examples of the wireless communications system 100, wideband communications may be performed according to a 20 MHz carrier bandwidth and narrowband communications may be performed according to a 1.4 MHz carrier bandwidth.

Devices of the wireless communications system 100 (e.g., base stations or UEs 115) may have a hardware configuration that supports communications over a particular carrier bandwidth, or may be configurable to support communications over one of a set of carrier bandwidths. For example, base stations 105 or UEs 115 may perform some communications according to a system bandwidth (e.g., wideband communications), and may perform some communications according to a smaller bandwidth (e.g., narrowband communications). In some examples, the wireless communications system 100 may include base stations 105 and/or UEs that can support simultaneous communications via carriers associated with more than one different bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may use a combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Wireless communications system 100 may support reference signal bundling where the base station 105 may configure common parameters, such as a common precoding, to coherently transmit the DMRSs across a bundle of time units (e.g., TTIs) or data transmissions. Accordingly, the UE 115 may assume that a common precoder is used to transmit the DMRSs across some or all of a plurality of data transmissions. In this way, the UE 115 may coherently filter the received DMRSs (e.g., leveraging knowledge of a common phase of the DMRSs across TTIs of one bundle) to improve the accuracy of its channel estimation procedures by jointly processing the DMRSs received in each bundle.

In some cases, UE 115 may determine to bundle or not bundle the reference signals (e.g., DMRS) of downlink data transmissions using an indication from base station 105 received on communication link 125. The indication may be referred to as an NBI and may be transmitted via control signaling (e.g., DCI) from base station 105 to UE 115. For instance, a single bit of the DCI may be used as an NBI to dynamically indicate the relation of a current precoding scheme as compared to a preceding precoding scheme. For example, the bit may indicate if the current precoding scheme is the same as a previous precoding scheme, or the bit may indicate if the current precoding scheme is different than the previous precoding scheme.

In some cases, UE 115 may determine to bundle or not bundle the reference signals based further on parameter(s) in addition to the NBI, to address the issue of potential failure to correctly receive an NBI. For example, UE 115 may also determine reference signal bundling configuration based on whether DAI values are received sequentially from base station 105. If UE 115 receives from base station 105 a subsequent PDCCH having a DAI that is not sequentially higher than the DAI received in the prior PDCCH, the UE may assume that one or more PDCCH transmissions may have been missed. As such, UE 115 may determine not to bundle reference signal transmissions scheduled by the subsequent PDCCH with reference signal transmissions scheduled by the prior PDCCH, even if the NBI bits associated with both PDCCH are the same value. As disclosed further herein, UE 115 may determine the reference signal bundling configuration based on other factors, such as a measurement of a gap between consecutive PDCCH scheduling downlink transmissions with reference signals.

Figure 2:
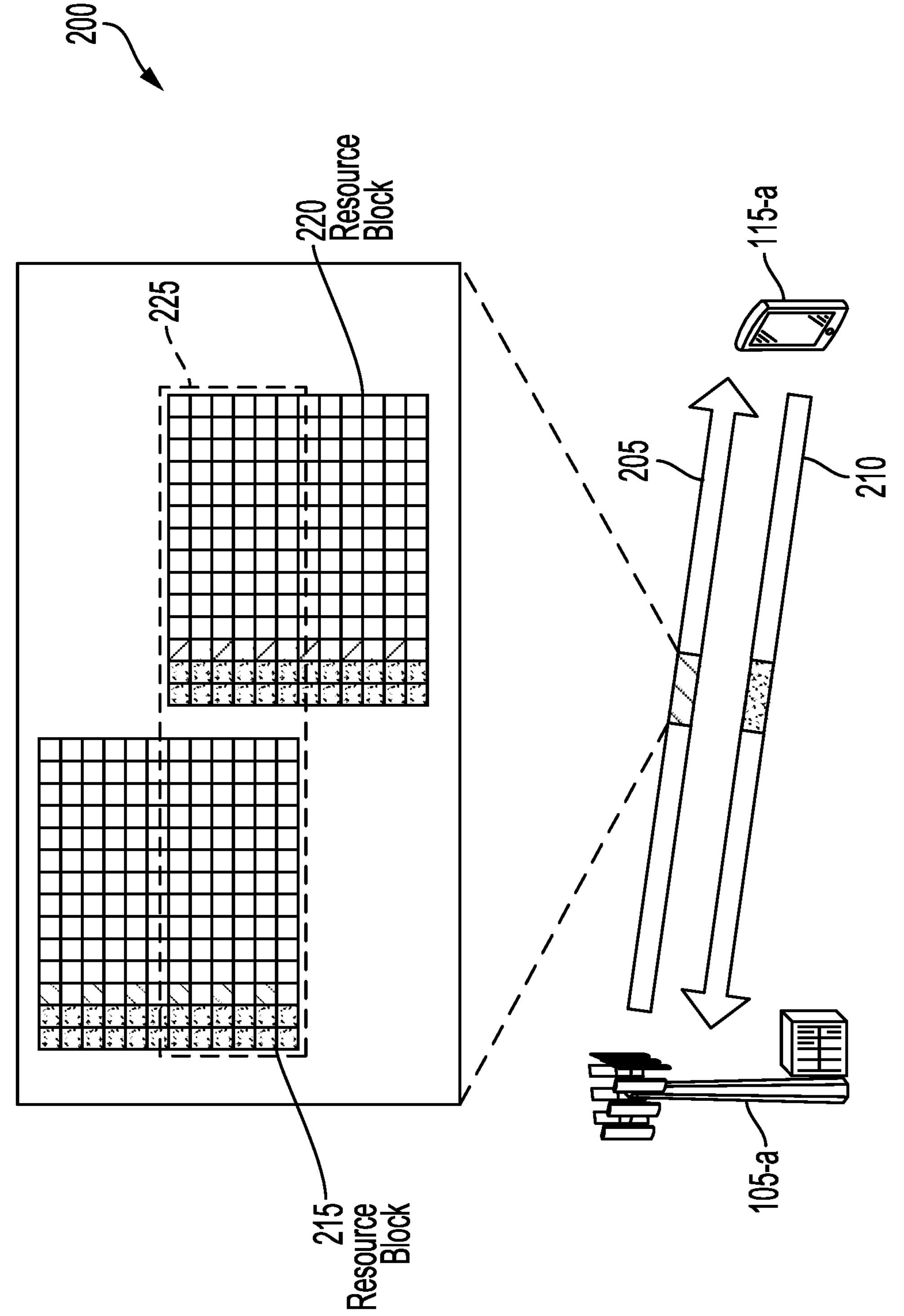
FIG. 2 illustrates an example of a system for wireless communication that supports reference signal bundling enhancements in accordance with aspects of the present disclosure.

FIG. 2 illustrates an example of a wireless communication system 200 that supports enhancements for reference signal bundling indication in accordance with various aspects of the present disclosure. In some examples, wireless communication system 200 may implement aspects of wireless communication system 100. For example, wireless communication system 200 includes UE 115-*a* and base station 105-*a*, which may be examples of the corresponding devices described with reference to FIG. 1. Wireless communication system 200 may support reference signal bundling procedures for UEs 115-*a* that communicating with a base station 105-*a*.

Base station 105-*a* may transmit downlink messages to UE 115-*a* on resources of a carrier 205, and UE 115-*a* may transmit uplink messages to base station 105-*a* on resources of a carrier 210. In some cases, carriers 205 and 210 may be a same carrier or may be separate carriers. Exemplary downlink data transmissions are shown in detail and may include resource block 215 (e.g., a first PDSCH) and resource block 220 (e.g., a second PDSCH) transmitted after resource block 215.

As described herein, UE 115-*a* may determine whether to bundle, which may refer to time domain bundling, the reference signals (e.g., DMRS) of resource block 215 and resource block 220. Bundling may refer to a receiver (e.g., UE 115-*a*) assuming a same precoder has been applied across multiple data transmissions or data channels of different scheduling units (e.g., a first PDSCH transmission and the following PDSCH transmission) including the DMRS associated with each downlink data transmission on the data channel, and a transmitter (e.g., base station 105-*a*) may coherently transmit reference signals (e.g., DMRS) associated with the data channels over different time instances (e.g., TTIs, slots, or mini-slots) on an antenna port. Additionally, the receiver may jointly process and/or coherently filter the different reference signals received with each data channel to improve channel estimation. Bundling may occur over time or across frequencies or both.

In some cases, UE 115-*a* may determine whether to bundle the reference signals (e.g., DMRS) of resource block 215 and resource block 220 using an indication, such as an NBI, from base station 105-*a*. The NBI may be transmitted via control signaling (e.g., DCI) to UE 115-*a*. For instance, a single bit of the DCI may be used for the NBI, which may dynamically indicate whether the current precoding scheme for the current DMRS is the same as a previous precoding scheme for DMRS. In some cases, the precoding scheme includes the precoder or other precoding parameters applied to the DMRS that is determined by the base station 105-*a*.

In some examples, the NBI may indicate that the current precoding scheme (e.g., of resource block 220) is the same as a previous precoding scheme (e.g., of resource block 215, which may have been received earlier). In some cases, even though the NBI indicates that bundling is possible for resource blocks 215 and 220, the UE 115-*a* may check other parameters to determine whether to bundle the resource blocks 215 and 220. For example, a DAI may be included with the NBI via control signaling to UE 115-*a*. If UE 115-*a* determines that the DAI corresponding to the NBI in which resource block 220 is scheduled is sequentially consecutive to the DAI corresponding to the NBI in which resource block 215 is scheduled, UE 115-*a* may assume that the NBI indicators were correctly received and may perform bundling for resource blocks 215 and 220 if the NBI indicator is not toggled. If, however, UE 115-*a* determines that the DAI corresponding to the NBI in which resource block 220 is scheduled is sequentially consecutive to the DAI corresponding to the NBI in which resource block 215 is scheduled, UE 115-*a* may assume there may be a dropped NBI between the NBI associated with resource block 215 and the NBI associated with resource block 220. Accordingly, UE 115-*a* may not perform bundling for resource blocks 215 and 220 even if the NBI is not toggled for the resource blocks 215 and 220.

Figure 3:
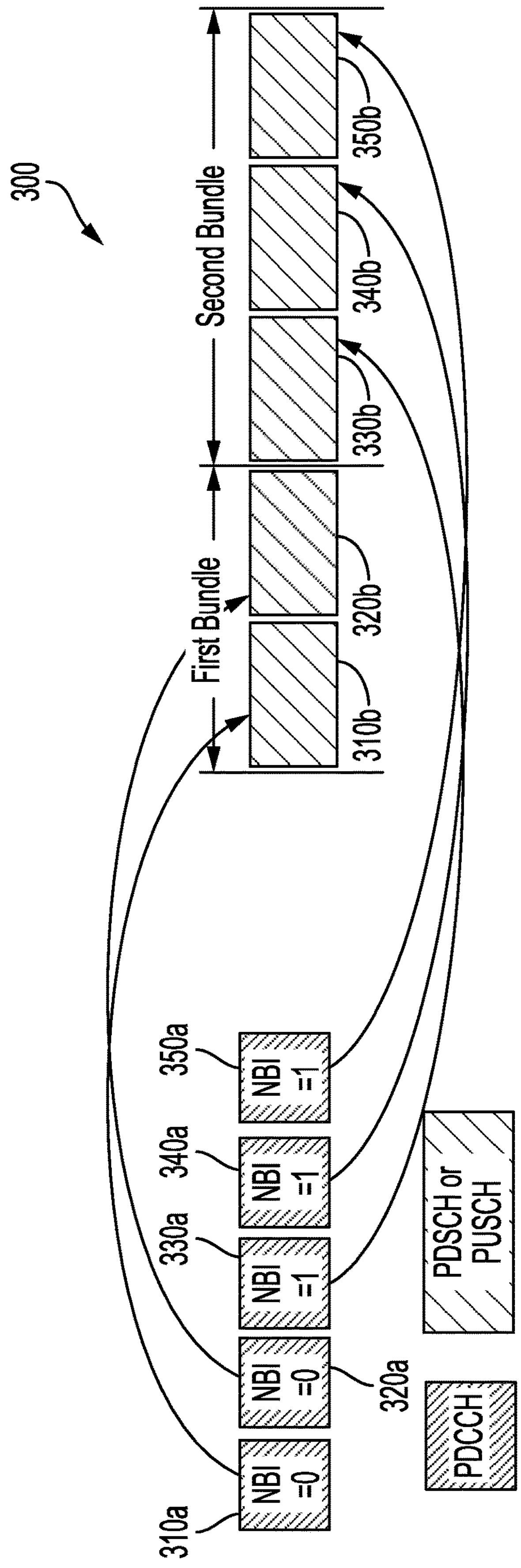
FIG. 3 illustrates a reference signal bundling example in accordance with various aspects of the present disclosure.

FIG. 3 illustrates an example depiction 300 of signaling for reference signal bundling. As seen in FIG. 3, a base station 105 may transmit a series of control channel transmissions (i.e., PDCCH), each containing a NBI 310*a*, 320*a*, 330*a*, 340*a*, and 350*a*, and scheduling a series of shared channel transmissions (i.e., PDSCH) 310*b*, 320*b*, 330*b*, 340*b*, and 350*b*. The PDSCH transmissions 310*b*, 320*b*,

330*b*, 340*b*, and 350*b* may be spread across five slots, for example, and each PDSCH transmission may include reference signal transmissions, such as DMRS transmissions. In some instances, the DMRS transmissions are bundled across consecutive slots such that bundled DMRS transmissions across slots have a coherent phase to allow for joint channel estimation for the consecutive slots. To indicate to a UE 115 which DMRS transmissions for different slots should be bundled, a base station 105 may use a one-bit indicator in the DCI of the PDCCH (e.g., 310*a*) that schedules the PDSCH transmission (e.g., 310*b*). The indicator may be referred to as a new bundling indicator (NBI), and the UE 115 may interpret the NBI received associated with PDCCH that schedules different PDSCH as a toggle for whether to bundle the DMRS associated with a particular slot with the DMRS associated with a different adjacent slot.

In the illustrated example, a first NBI 310*a* associated with a PDCCH that schedules a first PDSCH transmission 310*b* may have a value of 0. A second NBI 320*a* associated with a PDCCH that schedules a second PDSCH transmission 320*b* may also have a value of 0. Accordingly, the UE 115 may recognize that DMRS transmissions in the first and second PDSCH transmissions 310*b* and 320*b* should be bundled based on their respective NBI having a same value of 0. A third NBI 330*a* associated with a PDCCH that schedules a third PDSCH transmission 330*b*, however, may comprise a different value of 1. In other words, the NBI bit may toggle from a 0 to a 1 at the third NBI 330*a* for the third PDSCH transmission 330*b*. At this juncture, the UE 115 may recognize that the DMRS transmissions of the third PDSCH 330*b* are not to be bundled with the DMRS transmissions of the first and second PDSCH 310*b* and 320*b*. Subsequent fourth and fifth NBI 340*a* and 350*a* may also have a value of 1, similar to the third NBI 330*a*. Accordingly, the UE 115 may bundle the respective DMRS transmissions in PDSCH 330*b*, 340*b*, and 350*b*. In some instances, the base station 105 may indicate different bundling configurations through NBI due to changing channel conditions, for example.

Figure 4:
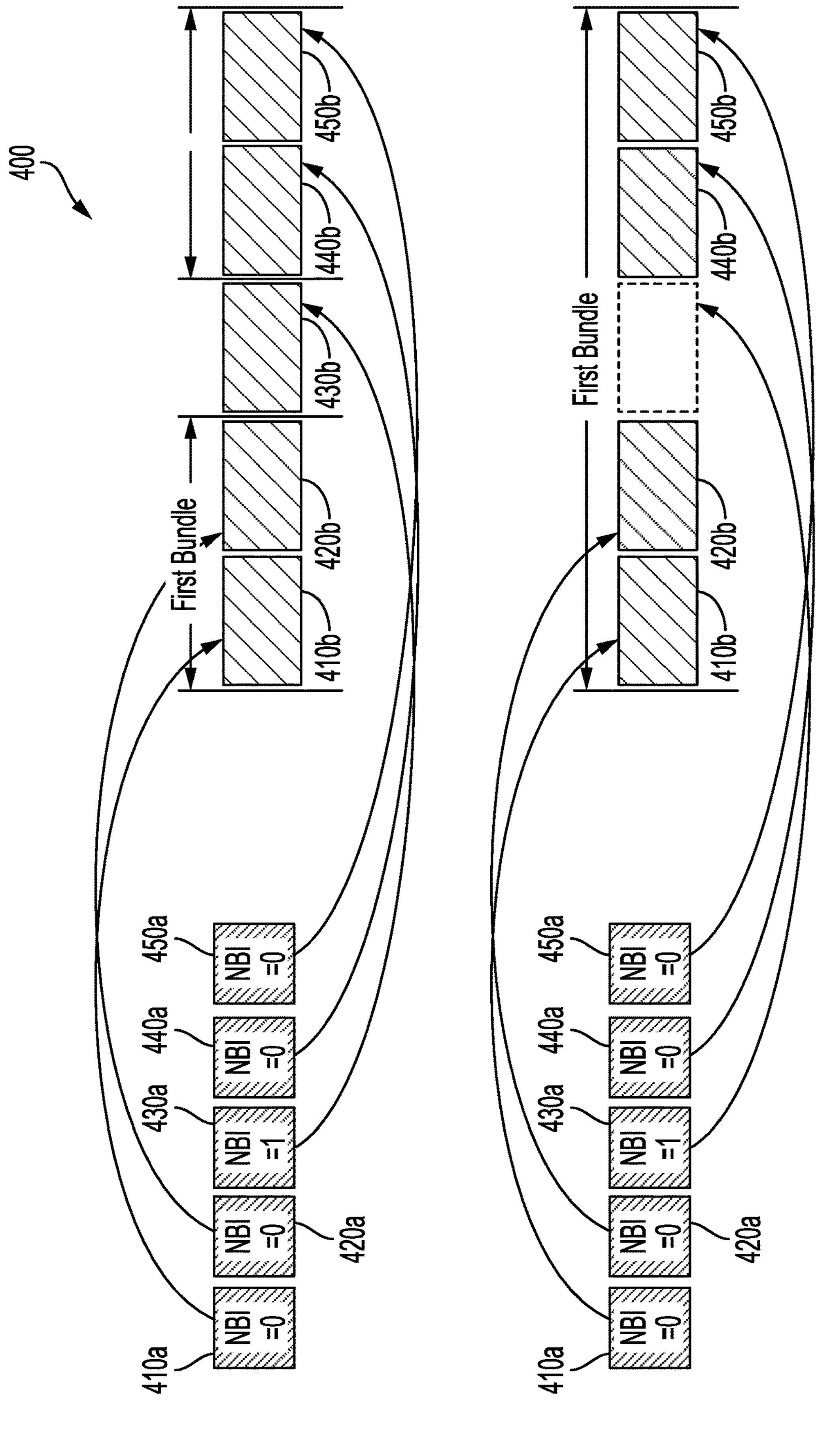
FIG. 4 illustrates a reference signal bundling example in accordance with various aspects of the present disclosure.

FIG. 4 illustrates an example depiction 400 of a potential issue with signaling for reference signal bundling. As seen in FIG. 4, the NBI 410*a*, 420*a*, 430*a*, 440*a*, and 450*a* transmitted by a base station 105 have values indicating a sequence of 0, 0, 1, 0, 0. The sequence and toggling of NBI indicate to a UE 115 that DMRS transmissions in corresponding PDSCH 410*b* and 420*b* should be bundled, the DMRS transmissions in PDSCH 430*b* are not to be bundled with other DMRS transmissions, and that DMRS transmissions in corresponding PDSCH 440*b* and 450*b* should be bundled. In the illustrated example, however, one of the NBI 430*a* is not properly received or decoded by the UE 115. Accordingly, the UE 115 identifies only a sequence of NBI 410*a*, 420*a*, 440*a*, and 450*a* all having a same value of 0, since the UE 115 failed to receive the NBI 430*a* indicating a toggle of the NBI bit. In this instance, the UE 115 may incorrectly attempt to bundle DMRS transmissions associated with PDSCH 410*b*, 420*b*, 440*b*, and 450*b*.

Figure 5:
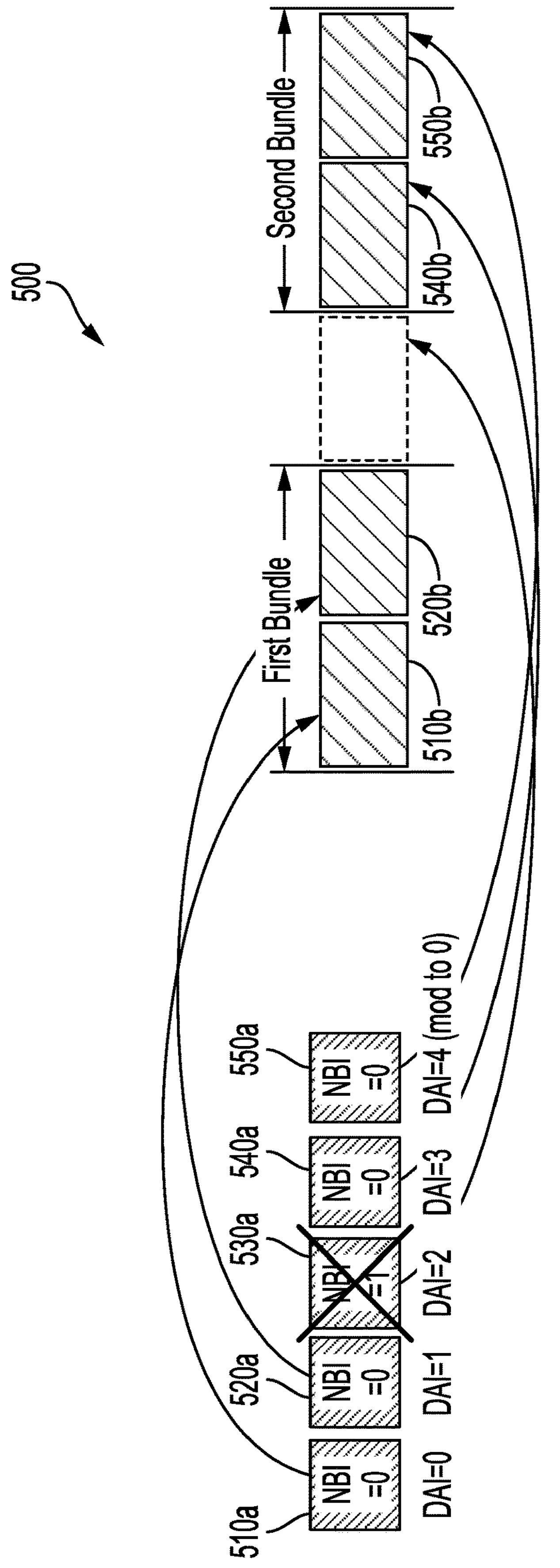
FIG. 5 illustrates a reference signal bundling example with enhancements in accordance with various aspects of the present disclosure.

FIG. 5 illustrates an example depiction 500 of enhancements to signaling for reference signal bundling. As seen in FIG. 5, the NBI 510*a*, 520*a*, 530*a*, 540*a*, and 550*a* transmitted by a base station 105 have values indicating a sequence of 0, 0, 1, 0, 0. Similar to FIG. 4, the sequence and toggling of the NBI values indicate to a UE 115 that DMRS transmissions in corresponding PDSCH 510*b* and 520*b* should be bundled, the DMRS transmissions in PDSCH 530*b* are not to be bundled with other DMRS transmissions, and that DMRS transmissions in corresponding PDSCH 540*b* and 550*b* should be bundled. In addition to transmission of NBI, however, the base station 105 may also transmit a downlink assignment indicator (DAI) with the PDCCH that schedules the PDSCH transmissions. In the present scenario, the DAI may serve as a counter for the PDCCH transmissions, where each consecutive PDCCH includes a DAI with value incremented by one. In the illustrated example, NBI 510*a* is associated with a DAI with value 0, NBI 520*a* is associated with a DAI with value 1, NBI 530*a* is associated with a DAI with value 2, NBI 540*a* is associated with a DAI with value 3, and NBI 550*a* is associated with a DAI with value 4 (mod to 0). Accordingly, the UE 115 may determine whether a particular PDCCH is missed based on whether sequential DAI values are received. In the illustrated example, the PDCCH associated with NBI 530*a* is missed, and the UE 115 determines that DAI values of 0 and 1 are received, followed by DAI with a value of 3. Due to the missing DAI value of 2, the UE 115 may determine that NBI 530*a* was missed, and that DMRS transmissions scheduled by PDCCH received after the missing NBI 530*a* should not be bundled with DMRS transmissions scheduled by PDCCH received prior to the missing NBI 530*a*.

Figure 6:
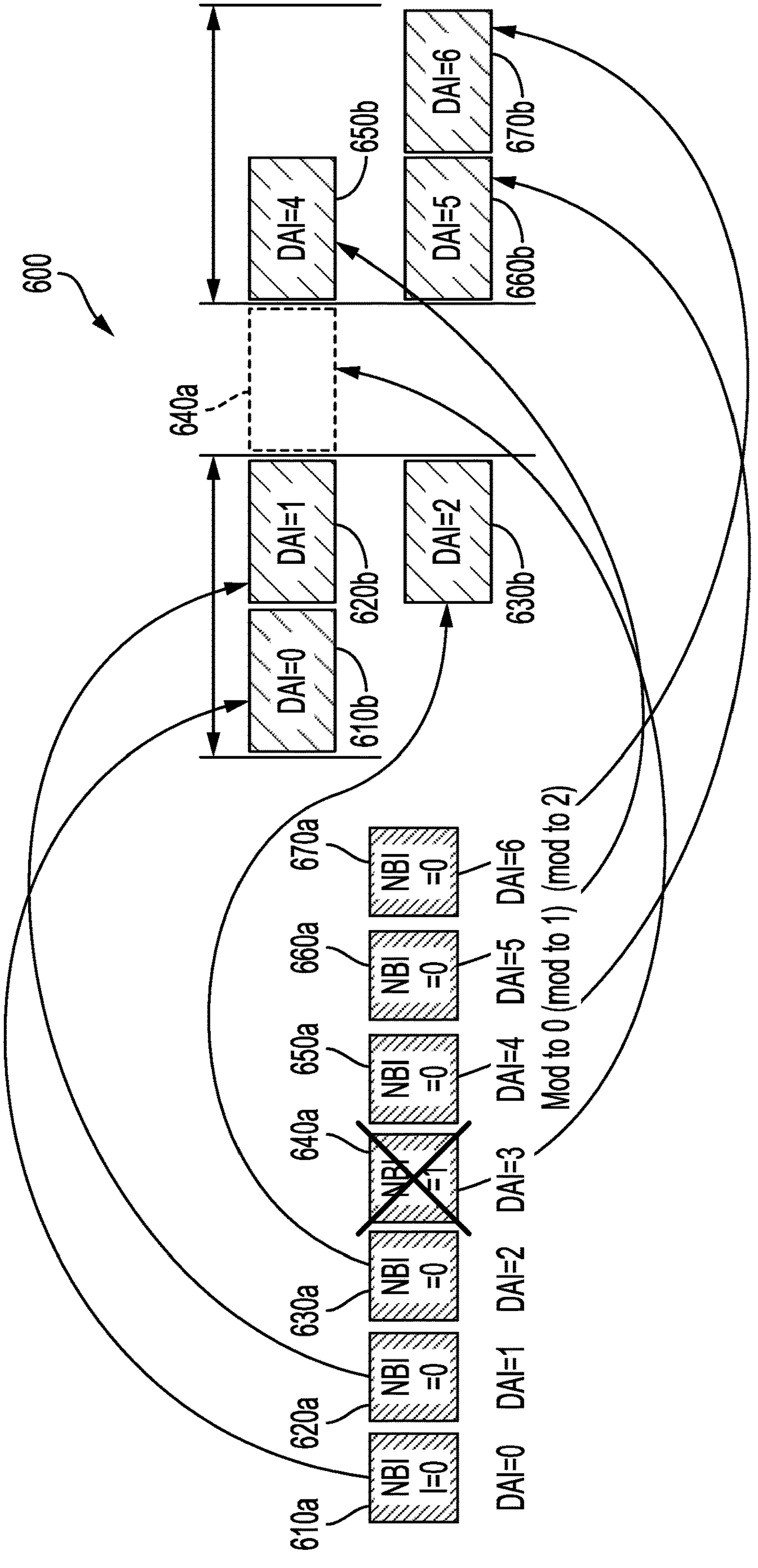
FIG. 6 illustrates a reference signal bundling example with enhancements in accordance with various aspects of the present disclosure.

FIG. 6 illustrates an example depiction 600 of enhancements to signaling for reference signal bundling in a carrier aggregation context. As seen in FIG. 6, the NBI 610*a*, 620*a*, 630*a*, 640*a*, 650*a*, 660*a*, and 670*a* transmitted by a base station 105 have values indicating a sequence of 0, 0, 0, 1, 0, 0, 0. In a carrier aggregation context, the NBI 610*a*, 620*a*, 630*a*, 640*a*, 650*a*, 660*a*, and 670*a* are associated with respective PDCCH transmissions that schedule respective PDSCH transmissions on different carriers across different slots. In the illustrated example, the base station 105 may schedule PDSCH transmissions 610*b*, 620*b*, 640*b*, and 650*b* on a first carrier and PDSCH transmissions 630*b*, 660*b*, and 670*b* on a second carrier. The sequence and toggling of the NBI values indicate to a UE 115 which DMRS transmissions in corresponding PDSCH transmissions should be bundled. In a carrier aggregation context, DMRS transmissions on different carriers generally are not bundled due to the different channel conditions on different component carriers. In the illustrated example, although NBI indicators 610*a*, 620*a*, and 630*a* indicate that their corresponding DMRS transmissions for PDSCH 610*b*, 620*b*, and 630*b* should be bundled, the UE 115 may bundle DMRS transmissions in PDSCH 610*b* and 620*b*, since they are on the same carrier, while DMRS transmissions for PDSCH 630*b* is not bundled with PDSCH 610*b* and 620*b*. Similarly, due to toggling of NBI at the indicator 640*a* and again at 650*a*, the DMRS transmissions in PDSCH 640*b* are not to be bundled with other DMRS transmissions, and DMRS transmissions in corresponding PDSCH 660*b* and 670*b* should be bundled, while DMRS transmissions in PDSCH 650*b* should not be bundled due to its transmission on a different carrier from PDSCH 660*b* and 670*b*.

In addition to transmission of NBI, however, the base station 105 may also transmit a downlink assignment indicator (DAI) with the PDCCH that schedules the PDSCH transmissions. In the present scenario, the DAI may serve as a counter for the PDCCH transmissions, where each consecutive PDCCH includes a DAI with value incremented by one. In the illustrated example, NBI 610*a* is associated with a DAI with value 0, NBI 620*a* is associated with a DAI with value 1, NBI 630*a* is associated with a DAI with value 2, NBI 640*a* is associated with a DAI with value 3, NBI 650*a* is associated with a DAI with value 4 (mod to 0), NBI 660*a* is associated with a DAI with value 5 (mod to 1), and NBI 670*a* is associated with a DAI with value 6 (mod to 2).

Accordingly, the UE 115 may determine whether a particular PDCCH is missed based on whether sequential DAI values are received.

In the illustrated example, the PDCCH associated with NBI 640*a* is missed, and the UE 115 determines that DAI values of 0, 1, and 2 are received, followed by DAI with a value of 4. Due to the missing DAI value of 3, the UE 115 may determine that NBI 640*a* was missed, and that DMRS transmissions scheduled by PDCCH received after the missing NBI 640*a* should not be bundled with DMRS transmissions scheduled by PDCCH received prior to the missing NBI 640*a*. That is, based on both the NBI and DAI received in PDCCH in the present example, the UE 115 determines that DMRS transmissions of PDSCH 610*b* and 620*b* should be bundled, and DMRS transmissions of PDSCH 660*b* and 670*b* should be bundled, while DMRS transmissions of PDSCH 630*b* and 650*b* should not be bundled with other DMRS transmission. As shown in this example, without determining bundling configuration based additionally on DAI, the UE 115 would have determined that NBI is not toggled for each received NBI 610*a*, 620*a*, 630*a*, 650*a*, 660*a*, and 670*a*. Accordingly, the UE 115 would have incorrectly determined that DMRS transmissions of PDSCH 610*b*, 620*b*, and 650*b* should be bundled due to the missing NBI toggle at NBI 640*a*.

The UE 115 may also determine a bundling configuration based on other parameters. For example, if a base station 105 intends for bundling of reference signals in consecutive PDSCH, it will transmit consecutive PDCCH that schedule the consecutive PDSCH. If a first PDSCH is received but a second PDSCH is not received until after a certain time has passed, the UE 115 may assume either that the base station 105 does not intend for bundling of the corresponding PDSCH or that an intervening PDSCH was missed or dropped between receiving the first and second PDSCH. In any event, the UE 115 may determine that a threshold time has passed between the first and second PDSCH, so the scheduled PDSCH transmissions should not be bundled. Accordingly, in some instances, in order to address potential failure to properly receive a NBI, a UE 115 may also determine a bundling configuration based on a gap between consecutive PDSCH transmissions. For example, if the gap between consecutive PDSCH transmissions exceeds a threshold number of symbols, the UE 115 may determine not to perform bundling of reference signals between the two consecutive PDSCH transmissions. If, however, the gap between consecutive PDSCH transmissions is less than the threshold number of symbols, the UE 115 may determine to perform bundling of reference signals in the two consecutive PDSCH, subject to the NBI toggling indication scheme described above in reference to FIG. 3.

Figure 7:
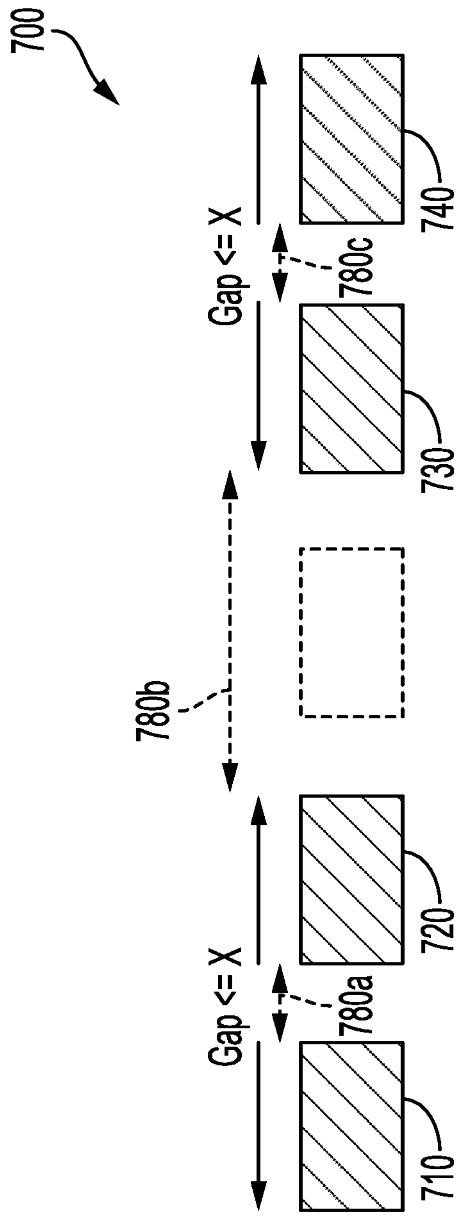
FIG. 7 illustrates a reference signal bundling example with enhancements in accordance with various aspects of the present disclosure.

FIG. 7 illustrates an example depiction 700 of enhancements to signaling for reference signal bundling based on a gap between consecutive downlink transmissions. The UE 115 may perform reference signal bundling only on adjacent PDSCH transmissions as determined based on whether a gap between consecutive PDSCH is greater than a threshold amount of time. In some instances, the threshold X is measured in number of symbols. If the UE 115 has capability of slot level DMRS bundling, the threshold X may need to be less than the number of symbols in a slot (e.g., 14 OFDM symbols). The UE 115 may report its capability for slot level DMRS bundling to the base station 105. The UE 115 may also be capable of mini-slot level bundling, in which case, the UE 115 may also report a length of the mini-slot in number of OFDM symbols to the base station 105. The base station 105 may then use the capability information to determine a threshold X number of symbols for the UE 115 to identify whether consecutive PDSCH transmissions are considered "adjacent" and potentially available for bundling.

As seen in FIG. 7, a UE 115 may receive a first PDSCH 710 at a first point in time, and then a second PDSCH 720 at a second point in time. The UE 115 may measure a gap 780*a* between the first and second PDSCH 710 and 720 and compare the gap 780*a* to a threshold X. In the illustrated example, the gap 780*a* is less than the threshold X, so the UE 115 may perform bundling on the DMRS transmissions in PDSCH 710 and 720, subject to applicable NBI toggling rules (e.g., if the NBI associated with the PDSCH 710 and 720 indicate that PDSCH 710 and 720 should be bundled). Subsequently, the UE 115 may receive a third PDSCH 730, with a gap 780*b* between the second PDSCH 720 and the third PDSCH 730. In this case, the UE 115 may determine that the gap 780*b* is greater than the threshold X, so the UE 115 may determine not to perform bundling of DMRS in PDSCH 730 with the DMRS in PDSCH 710 and 720. The UE 115 may then receive a fourth PDSCH 740, with a gap 780*c* between the third PDSCH 730 and the fourth PDSCH 740. The gap 780*c* may be less than the threshold X, so the UE 115 may perform bundling of DMRS in PDSCH 730 and 740 if indicated by the base station 105.

Figure 8:
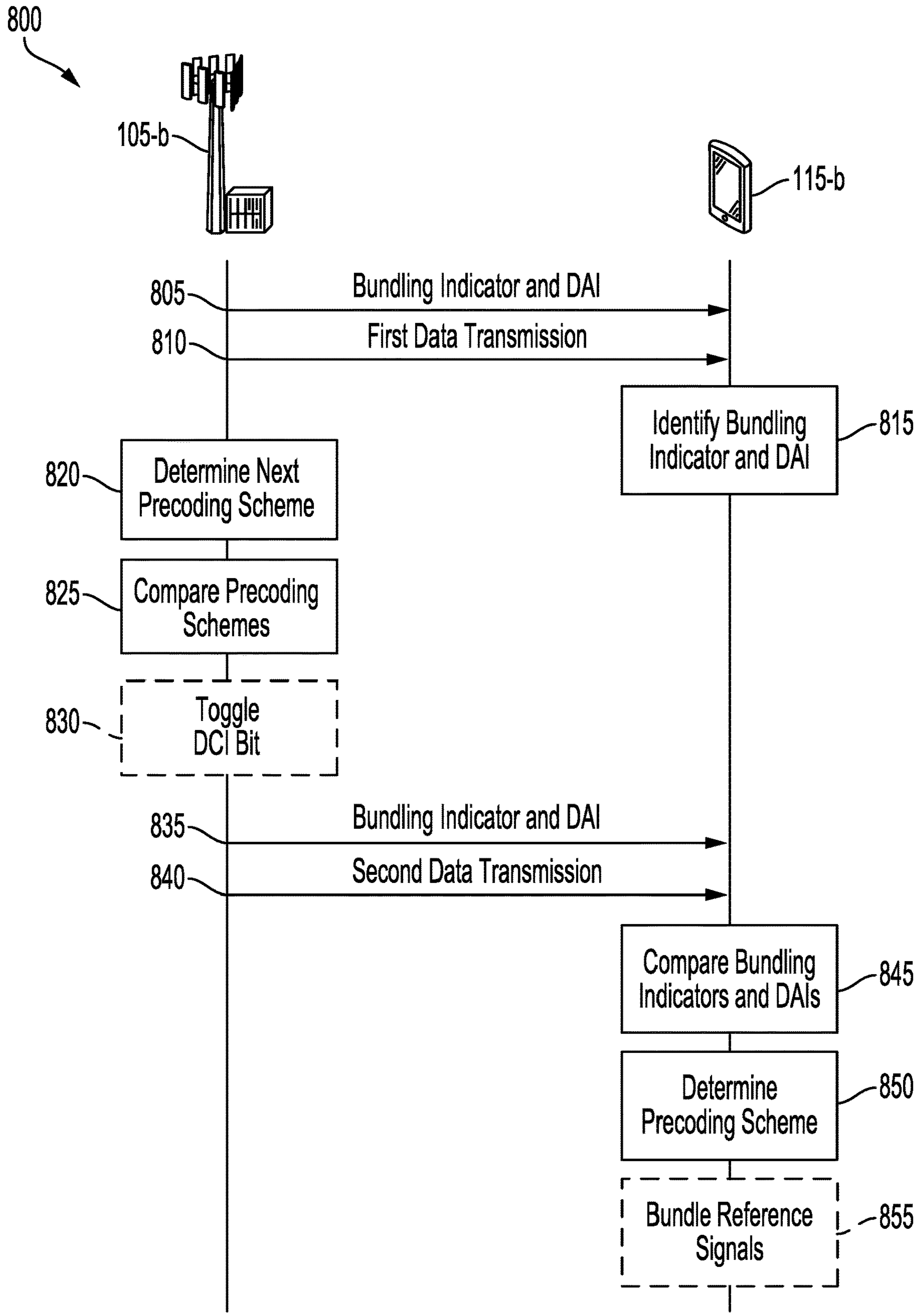
FIG. 8 illustrates an example of a process flow that supports reference signal bundling enhancements in accordance with aspects of the present disclosure.

FIG. 8 illustrates an example of a process flow 800 that supports reference signal bundling enhancements in accordance with aspects of the present disclosure. In some examples, process flow 800 may implement aspects of wireless communication systems 100 and/or 200. Process flow 800 may include a base station 105-*b* and a UE 115-*b*, which may be examples of corresponding base stations 105 and UEs 115, respectively, as described above with reference to FIGS. 1-2.

In the following description of the process flow 800, the operations between UE 115-*b* and base station 105-*b* may be transmitted in a different order than the order shown, or the operations performed by base station 105-*b* and UE 115-*b* may be performed in different orders or at different times. Certain operations may also be left out of the process flow 800, or other operations may be added to the process flow 800. It is to be understood that while base station 105-*b* and UE 115-*b* are shown performing a number of the operations of process flow 800, any wireless device may perform the operations shown.

At 805, base station 105-*b* may transmit, to UE 115-*b*, a bundling indicator and a downlink assignment indicator (e.g., NBI and DAI via DCI) associated with a first demodulation reference signal of a first downlink data transmission (e.g., the data transmission transmitted at 810). In some cases, the NBI may include a bit of DCI that indicates the precoding scheme of the first demodulation reference signal of the first downlink data transmission in relation to a previous precoding scheme of the previous data channel (e.g., previous PDSCH). The DAI may operate as a counter in which each subsequent DAI of consecutive PDCCH increments sequentially. At 810, base station 105-*b* may transmit, to UE 115-*b*, a data transmission (e.g., a PDSCH). As described with reference to FIGS. 2-3, a reference signal of the data transmission (e.g., a DMRS) may be precoded according to the NBI transmitted at 805. The bundling indicator may be transmitted in the same transmission as the first data transmission (e.g., as part of control signaling associated with the data transmission) or may be transmitted in a prior transmission.

At 815, UE 115-*b* may identify the NBI and DAI associated with the first demodulation reference signal of the first downlink data transmission. For example, the UE 115-*b* may store or recall the NBI and DAI received at 805.

At 820, base station 105-*b* may determine a precoding scheme to be applied to a second demodulation reference signal of a second downlink data transmission (e.g., the data transmission transmitted at 840), which may be subsequent to the first downlink data transmission (e.g., the data transmission transmitted at 810). Whether the precoding scheme is the same as or different from a previous precoding scheme may depend on a state of the channel or other channel characteristics.

At 825, base station 105-*b* may compare the precoding scheme to be applied to the second demodulation reference signal of a second downlink data transmission with the precoding scheme applied to the first demodulation reference signal of the first downlink data transmission.

At 830, base station 105-*b* may optionally toggle a bit value of the second NBI from a bit value of the first NBI (e.g., from 1 to 0 or from 0 to 1) when a different precoding scheme is applied to the second demodulation reference signal of a second downlink data transmission as the precoding scheme applied to the first demodulation reference signal of the first downlink data transmission. In cases where the precoding scheme is the same between first and second downlink data transmissions, the DCI bit of the NBI may not be toggled.

At 835, base station 105-*b* may transmit, to UE 115-*b*, a NBI and DCI (e.g., via DCI) associated with a second demodulation reference signal of a second downlink data transmission. In some cases, the NBI may include a bit of DCI that indicates the precoding scheme of the second demodulation reference signal of the second downlink data transmission in relation to a previous precoding scheme of the previous data transmission (e.g., previous PDSCH such as the data transmission transmitted at 810).

At 840, base station 105-*b* may transmit, to UE 115-*b*, a data transmission (e.g., a PDSCH), which may be precoded according to the NBI transmitted at 835. The bundling indicator may be transmitted in the same transmission as the second data transmission (e.g., as part of control signaling associated with the data transmission).

At 845, UE 115-*b* may compare the NBI received at 805 and the NBI received at 835 to determine if the indicator has been toggled. The UE 115-*b* may also compre the DAI received at 805 and the DAI received at 835 to determine if the DAI is sequentially incremented in value.

At 850, UE 115-*b* may determine a precoding scheme to be applied to the second demodulation reference signal based at least in part on a comparison of the first NBI and the second NBI at 845. For example, if the indicator is not toggled, then the same precoder may be applied as the previous data transmission associated with the first NBI, as long as the first DAI and the second DAI are sequentially numbered. If the first DAI and the second DAI are not sequentially numbered, the UE 115-*b* may assume that an intervening bundling indicator and DAI may have been dropped. Accordingly, the UE 115-*b* may determine not to use the same precoder for the second data transmission as the first data transmission despite the fact that the indicator is not toggled. In another example, if the indicator is toggled, then a different precoder may be applied with respect to the previous data transmission associated with the first NBI.

At 855, UE 115-*b* may optionally bundle (e.g., apply the same precoder) the second demodulation reference signal of a second downlink data transmission with the first demodulation reference signal of a first downlink data transmission based at least in part on the first NBI and the second NBI being the same and on the first DAI and second DAI being sequentially incremented.

Figure 9:
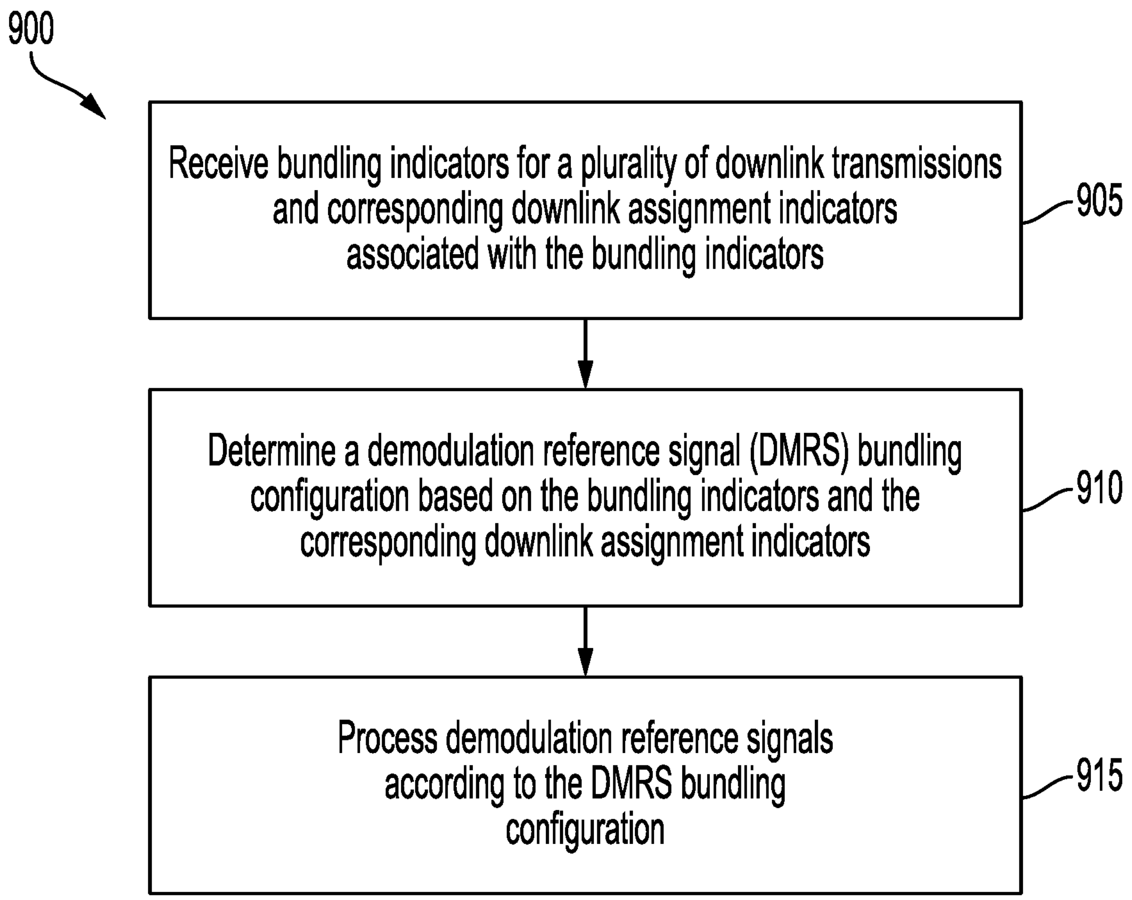
FIGS. 9-11 show flowcharts illustrating methods that support reference signal bundling enhancements in accordance with aspects of the present disclosure.

FIG. 9 shows a flowchart illustrating a method 900 for reference signal bundling indication enhancements in wireless communications in accordance with aspects of the present disclosure. The operations of method 900 may be implemented by a UE 115 or its components as described herein. For example, the operations of method 900 may be performed by a communications manager as described with reference to FIG. 13. In some examples, a UE 115 may execute a set of codes to control the functional elements of the device to perform the functions described below. Additionally or alternatively, the UE 115 may perform aspects of the functions described below using special-purpose hardware.

At 905, the UE 115 receives bundling indicators for a plurality of downlink transmissions and corresponding downlink assignment indicators associated with the bundling indicators. At 910, the UE 115 determines a demodulation reference signal (DMRS) bundling configuration based on the bundling indicators and the corresponding downlink assignment indicators. In some instances, determining the DMRS bundling configuration comprises determining that demodulation reference signals associated with consecutive bundling indicators having a same value are to be handled as bundled downlink transmissions. In some instances, the UE 115 may apply a same precoding scheme to demodulation reference signals handled as bundled downlink transmissions. At 915, the UE 115 processes demodulation reference signals according to the DMRS bundling configuration.

Although not explicitly illustrated in FIG. 9, the UE 115 may perform additional operations to support reference signal bundling indication enhancements. For example, the UE 115 may identify a discontinuity in consecutive downlink assignment indicators. In some instances, determining the DMRS bundling configuration further comprises determining that demodulation reference signals associated with bundling indicators received after the discontinuity are not to be handled as bundled downlink transmissions with respect to demodulation reference signals associated with bundling indicators received prior to the discontinuity. In some instances, determining the bundled downlink transmissions is further based on determining no discontinuity in the corresponding downlink assignment indicators.

Figure 10:
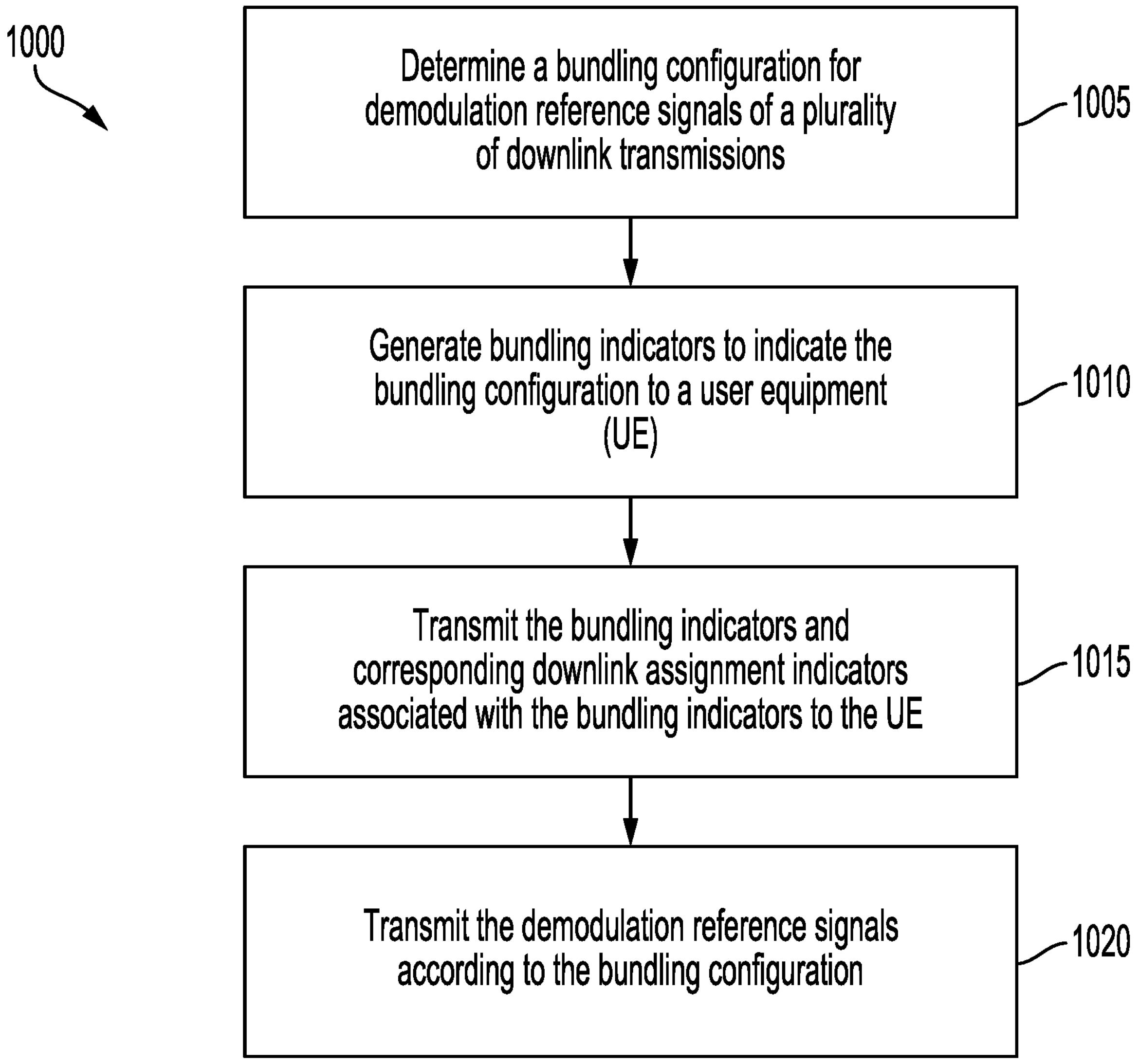

FIG. 10 shows a flowchart illustrating a method 1000 for reference signal bundling indication enhancements in wireless communications in accordance with aspects of the present disclosure. The operations of method 1000 may be implemented by a base station 105 or its components as described herein. For example, the operations of method 1000 may be performed by a communications manager as described with reference to FIG. 13. In some examples, a base station 105 may execute a set of codes to control the functional elements of the device to perform the functions described below. Additionally or alternatively, the base station 105 may perform aspects of the functions described below using special-purpose hardware.

At 1005, the base station 105 determines a bundling configuration for demodulation reference signals of a plurality of downlink transmissions. At 1010, the base station 105 generates bundling indicators to indicate the bundling configuration to a user equipment (UE). In some instances, generating the bundling indicators comprises generating a bundling indicator for each of the plurality of downlink transmissions, wherein downlink transmissions having demodulation reference signals that are bundled are associated with bundling indicators having a same value and downlink transmissions having demodulation reference signals that are not bundled are associated with bundling indicators having a different value. In some instances, the base station 105 applies a same precoding scheme to bundled demodulation reference signals. At 1015, the base station 105 transmits the bundling indicators and corresponding downlink assignment indicators associated with the bundling indicators to the UE. At 1020, the base station 105 transmits the demodulation reference signals according to the bundling configuration.

Figure 11:
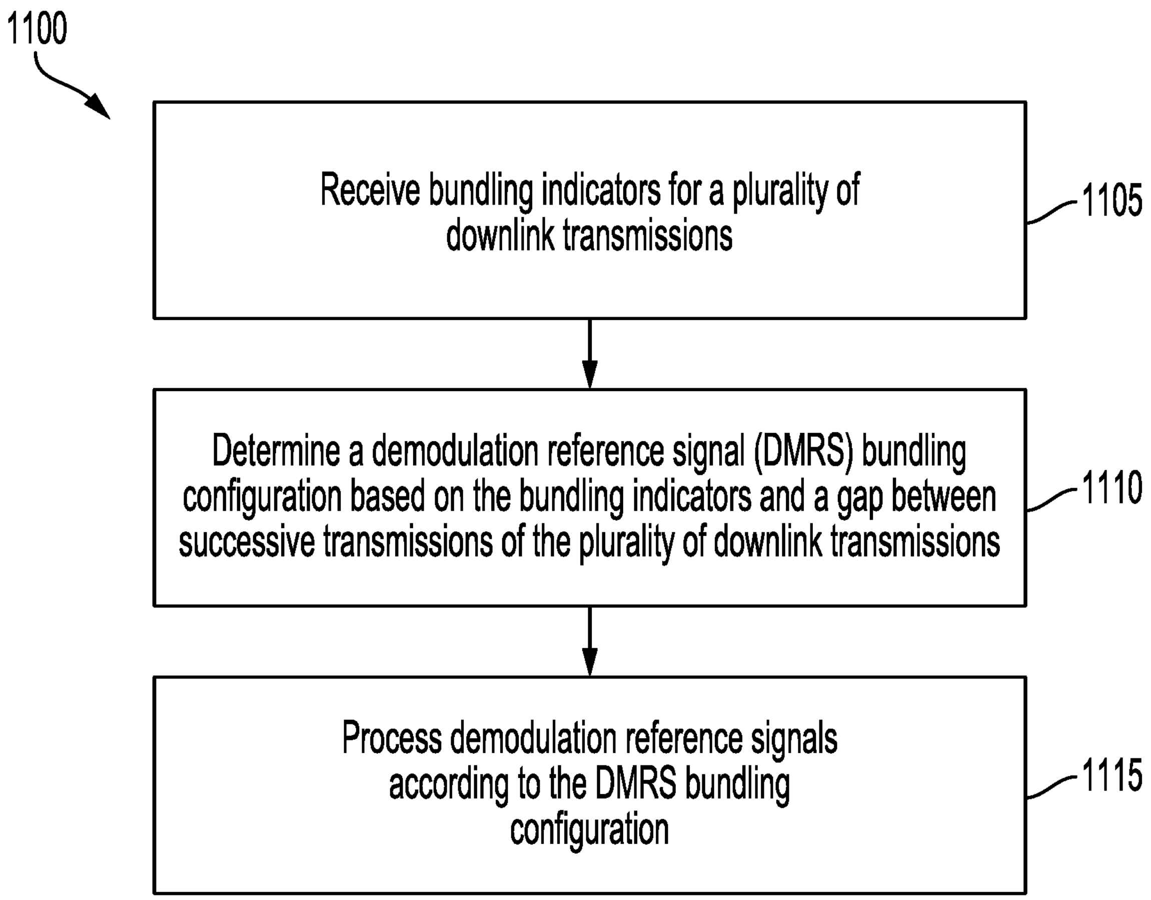

FIG. 11 shows a flowchart illustrating a method 1100 for reference signal bundling indication enhancements in wireless communications in accordance with aspects of the present disclosure. The operations of method 1100 may be implemented by a UE 115 or its components as described herein. For example, the operations of method 900 may be performed by a communications manager as described with reference to FIG. 13. In some examples, a UE 115 may execute a set of codes to control the functional elements of the device to perform the functions described below. Additionally or alternatively, the UE 115 may perform aspects of the functions described below using special-purpose hardware.

At 1105, the UE 115 receives bundling indicators for a plurality of downlink transmissions. At 1110, the UE 115 determines a demodulation reference signal (DMRS) bundling configuration based on the bundling indicators and a gap between successive transmissions of the plurality of downlink transmissions. In some instances, determining the DMRS bundling configuration comprises determining that demodulation reference signals associated with consecutive bundling indicators having a same value are to be handled as bundled downlink transmissions. In some instances, the UE 115 applies a same precoding scheme to demodulation reference signals handled as bundled downlink transmissions and/or performs joint channel estimation based on the demodulation reference signals being handled as bundled downlink transmissions. At 1115, the UE 115 processes demodulation reference signals according to the DMRS bundling configuration.

Although not explicitly illustrated in FIG. 11, the UE 115 may perform additional operations to support reference signal bundling indication enhancements. For example, the UE 115 may transmit a report indicating a level of DMRS bundling supported by the UE, and then receive, from a base station 105, an indication of a threshold number of orthogonal frequency division multiplexing (OFDM) symbols associated with the level of DMRS bundling. In some instances, the threshold number of orthogonal frequency division multiplexing (OFDM) symbols is determined by the base station 105 based on the level of bundling supported by the UE. In some instances, the UE 115 may determine that the gap is greater than the threshold number of OFDM symbols. In some instances, determining the DMRS bundling configuration further comprises determining that demodulation reference signals received after the gap are not to be handled as bundled transmissions with respect to demodulation reference signals received prior to the gap. In other cases, determining the bundled downlink transmissions is further based on determining that the gap is less than the threshold number of OFDM symbols.

Figure 12:
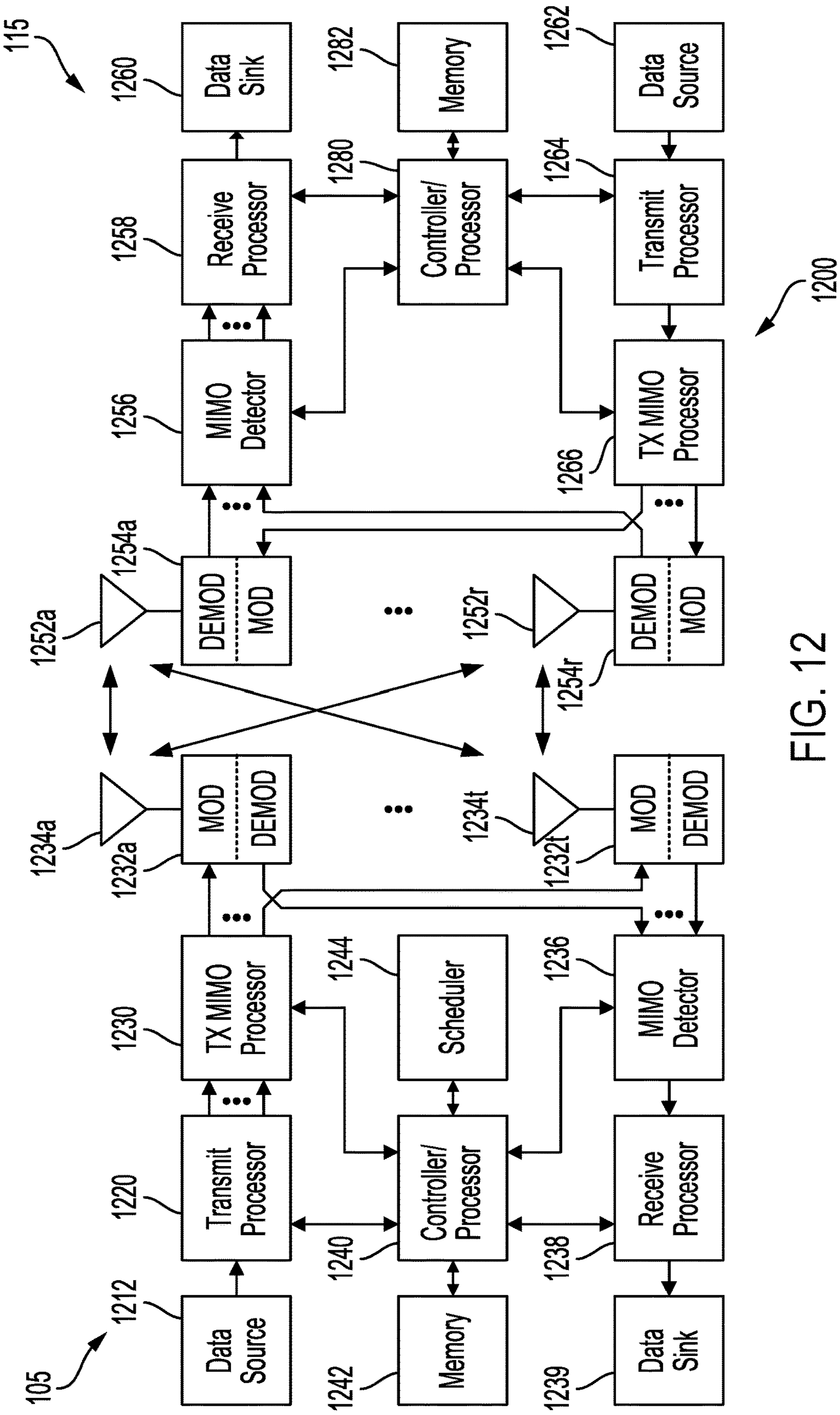
FIG. 12 is a block diagram illustrating a design of a base station/gNB/TRP and a UE configured according to one aspect of the present disclosure.

FIG. 12 shows a block diagram 1200 of a design of a base station/eNB/gNB 105 and a UE 115, which may be one of the base stations/eNBs/gNBs and one of the UEs in FIG. 1. At the eNB 105, a transmit processor 1220 may receive data from a data source 1212 and control information from a controller/processor 1240. The control information may be for various control channels such as the PBCH, PCFICH, PHICH, PDCCH, EPDCCH, MPDCCH etc. The data may be for the PDSCH, etc. The transmit processor 1220 may process (e.g., encode and symbol map) the data and control information to obtain data symbols and control symbols, respectively. The transmit processor 1220 may also generate reference symbols, e.g., for the PSS, SSS, and cell-specific reference signal. A transmit (TX) multiple-input multiple-output (MIMO) processor 1230 may perform spatial processing (e.g., precoding) on the data symbols, the control symbols, and/or the reference symbols, if applicable, and may provide output symbol streams to the modulators (MODs) 1232*a* through 1232*t*. Each modulator 1232 may process a respective output symbol stream (e.g., for OFDM, etc.) to obtain an output sample stream. Each modulator 1232 may further process (e.g., convert to analog, amplify, filter, and upconvert) the output sample stream to obtain a downlink signal. Downlink signals from modulators 1232*a* through 1232*t* may be transmitted via the antennas 1234*a* through 1234*t*, respectively. The downlink signals may include control channel (e.g., PDCCH) transmissions that schedule downlink shared channel (e.g., PDSCH) transmissions, including any DMRS transmissions associated with PDSCH transmission. The scheduling information may include bundling indicators that indicate a bundling configuration for DMRS transmissions in the downlink shared channel transmissions. The scheduling information may also include downlink assignment indicators or indication of a threshold number of OFDM symbols for determining bundling configuration, as described above with reference to FIGS. 5-7.

At the UE 115, the antennas 1252*a* through 1252*r* may receive the downlink signals from the eNB 105 and may provide received signals to the demodulators (DEMODs) 1254*a* through 1254*r*, respectively. Each demodulator 1254 may condition (e.g., filter, amplify, downconvert, and digitize) a respective received signal to obtain input samples. Each demodulator 1254 may further process the input samples (e.g., for OFDM, etc.) to obtain received symbols. A MIMO detector 1256 may obtain received symbols from all the demodulators 1254*a* through 1254*r*, perform MIMO detection on the received symbols if applicable, and provide detected symbols. A receive processor 1258 may process (e.g., demodulate, deinterleave, and decode) the detected symbols, provide decoded data for the UE 115 to a data sink 1260, and provide decoded control information to a controller/processor 1280.

On the uplink, at the UE 115, a transmit processor 1264 may receive and process data (e.g., for the PUSCH) from a data source 1262 and control information (e.g., for the PUCCH) from the controller/processor 1280. The transmit processor 1264 may also generate reference symbols for a reference signal. The symbols from the transmit processor 1264 may be precoded by a TX MIMO processor 1266 if applicable, further processed by the modulators 1254*a* through 1254*r* (e.g., for SC-FDM, etc.), and transmitted to the eNB 105. The transmissions to the eNB 105 may include a report indicating a bundling capability of the UE 115, for example. At the eNB 105, the uplink signals from the UE 115 may be received by the antennas 1234, processed by the demodulators 1232, detected by a MIMO detector 1236 if applicable, and further processed by a receive processor 1238 to obtain decoded data and control information sent by the UE 115. The processor 1238 may provide the decoded data to a data sink 1239 and the decoded control information to the controller/processor 1240.

The controllers/processors 1240 and 1280 may direct the operation at the eNB 105 and the UE 115, respectively. The controller/processor 1240 and/or other processors and modules at the eNB 105 may perform or direct the execution of the functional blocks illustrated in FIG. 10, and/or other various processes for the techniques described herein. The controllers/processor 1280 and/or other processors and modules at the UE 115 may also perform or direct the execution of the functional blocks illustrated in FIGS. 9 and 11, and/or other processes for the techniques described herein. The memories 1242 and 1282 may store data and program codes for the eNB 105 and the UE 115, respectively. For example, memory 1242 may store instructions that, when performed by the processor 1240 or other processors depicted in FIG. 12, cause the base station 105 to perform operations described with respect to FIG. 10. Similarly, memory 1282 may store instructions that, when performed by processor 1280 or other processors depicted in FIG. 12 cause the UE 115 to perform operations described with respect to FIGS. 9 and 11. A scheduler 1244 may schedule UEs for data transmission on the downlink and/or uplink.

While blocks in FIG. 12 are illustrated as distinct components, the functions described above with respect to the blocks may be implemented in a single hardware, software, firmware, or combination component or in various combinations of components. For example, the functions described with respect to the transmit processor 1220, the receive processor 1238, or the TX MIMO processor 1230 may be performed by or under the control of processor 1240.

Figure 13:
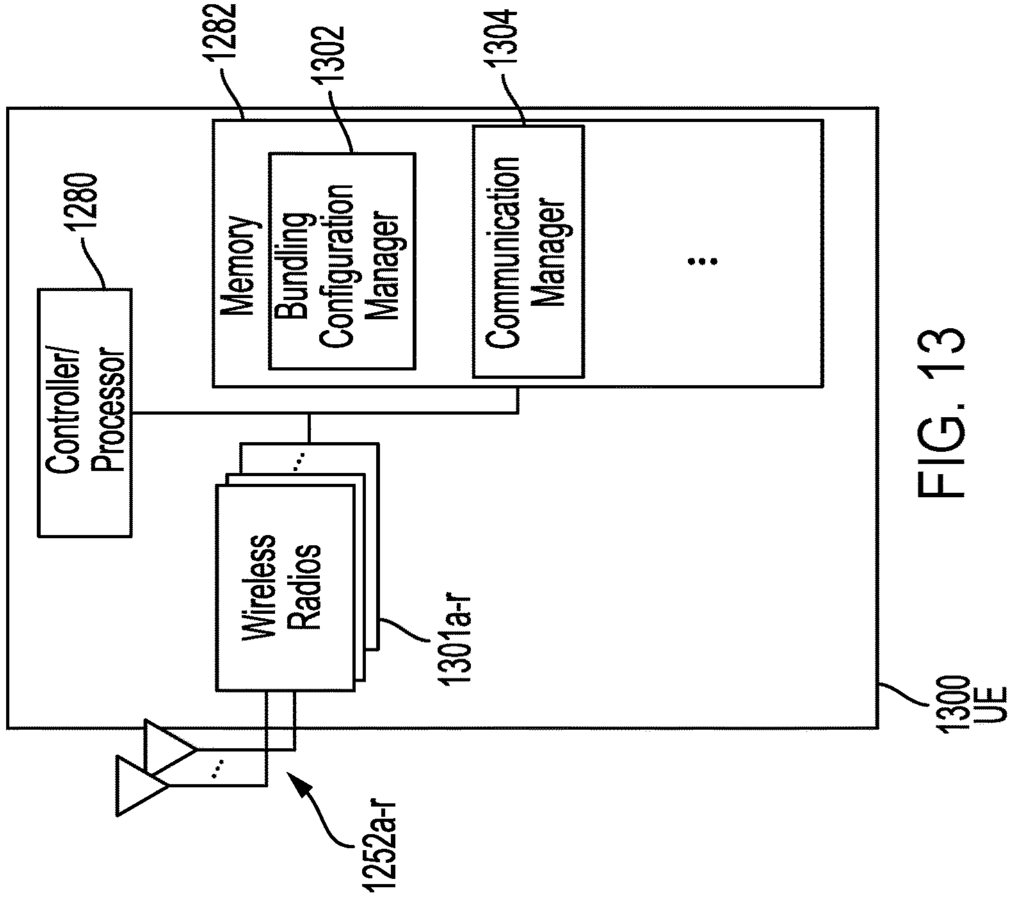
FIG. 13 is a block diagram illustrating a UE configured according to some embodiments of the present disclosure.

Turning now to FIG. 13, a UE 1300, such as a UE 115 (see FIG. 12), may have a controller/processor 1280, a memory 1282, and antennas 1252*a* through 1252*r*, as described above with respect to FIG. 12. UE 1300 may also have wireless radios 1301*a* to 1301*r* that comprise additional components also described above with reference to FIG. 12. The memory 1282 of UE 1300 stores one or more algorithms that configure processor/controller 1280 to carry out one or more procedures including, for example, those described above with reference to FIGS. 9 and 11.

One or more algorithms stored by memory 1282 configure processor/controller 1280 to carry out one or more procedures relating to wireless communication by the UE 1300, as previously described. For example, a bundling configuration manager 1302 may configure controller/processor 1280 to perform operations that include coordinating bundling configuration procedures and generating or receiving bundling configuration messages, as described above with reference to FIGS. 2-7, for transmission and reception using wireless radios 1301*a-r* and antennas 1252*a-r*. The bundling configuration messages may include bundling capability of the UE 1300 transmitted by UE 1300 to gNB 1400. Other bundling configuration messages may include a bundling indicators, downlink assignment indicators, or an indication of threshold of OFDM symbols between PDSCH transmissions for determining bundling configuration, transmitted by gNB 1400 to UE 1300. The bundling configuration manager 1302 may also configure controller/processor 1280 to determine a DMRS bundling configuration based on bundling indicators and the corresponding downlink assignment indicators or on a gap between successive PDSCH transmissions. Also, a communication manager 1304 may configure controller/processor 1280 to carry out operations including communicating, via wireless radios 1301*a* to 1301*r*, on a control or shared channel, the bundling indicators, downlink assignment indicators, demodulation reference signals, bundling capability information, or threshold information for determining bundling configuration. Other operations as described above may be carried out by one or more of the described algorithms or components 1302, 1304, and/or their various subcomponents.

Each of the illustrated components 1302, 1304 and/or at least some of their various sub-components may be implemented in hardware, software executed by a processor, firmware, or any combination thereof. If implemented in software executed by a processor, the functions of the bundling configuration manager 1302, communication manager 1304 and/or at least some of their various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The bundling configuration manager 1302, communication manager 1304 and/or at least some of their various sub-components may be physically located at various positions, including being distributed such that portions of functions are implemented at different physical locations by one or more physical devices. In some examples, bundling configuration manager 1302, communication manager 1304 and/or at least some of their various sub-components may be a separate and distinct component in accordance with various aspects of the present disclosure. In other examples, bundling configuration manager 1302, communication manager 1304 and/or at least some of their various sub-components may be combined with one or more other hardware components, including but not limited to an I/O component, a transceiver, a network server, another computing device, one or more other components described in the present disclosure, or a combination thereof in accordance with various aspects of the present disclosure.

Figure 14:
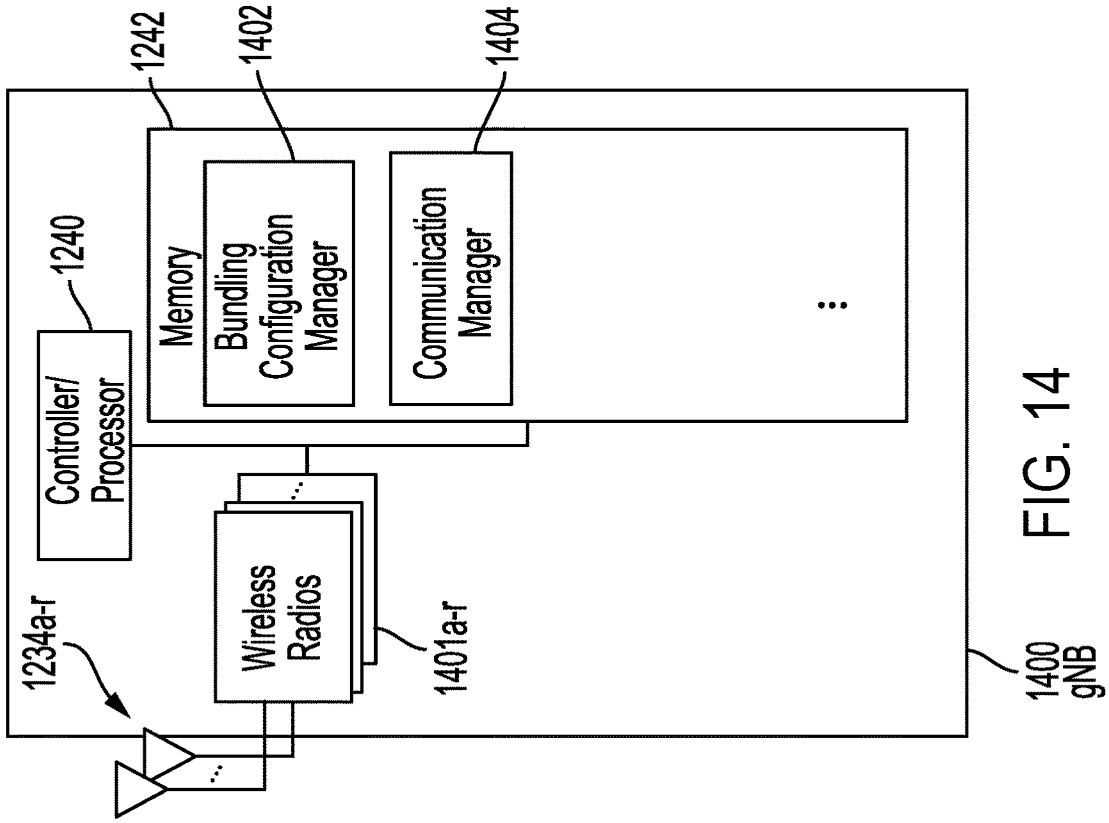
FIG. 14 is a block diagram illustrating a base station configured according to some embodiments of the present disclosure.

Referring now to FIG. 14, a base station 1400, such as a base station 105 (see FIG. 12), may have a controller/processor 1240, a memory 1242, and antennas 1234*a* through 1234*t*, as described above. The base station 1400 may also have wireless radios 1401*a* to 1401*t* that comprise additional components also described above with reference to FIG. 12. The memory 1242 of base station 1400 stores one or more algorithms that configure processor/controller 1240 to carry out one or more procedures as described above with reference to FIG. 10.

One or more algorithms stored by memory 1242 configure processor/controller 1240 to carry out one or more operations relating to wireless communication by the base station 1400, as previously described. For example, a bundling configuration manager 1402 configures controller processor 1240 to carry out operations that include coordinating reference signal bundling procedures and generating or receiving bundled reference signal transmissions, as described above with reference to FIGS. 2-7, for transmission and reception using wireless radios 1401*a-r* and antennas 1234*a-r*. The bundling configuration manager 1402 may configure controller/processor 1240 to determine a bundling configuration for demodulation reference signals of a plurality of downlink transmissions and generate bundling indicators to indicate the bundling configuration to UE 1300. Also, a communication manager 1404 may configure controller/processor 1240 to carry out operations including transmitting the bundling indicators and corresponding downlink assignment indicators associated with the bundling indicators or transmitting the demodulation reference signals according to the bundling configuration to the UE 1300, via wireless radios 1401*a* to 1401*r* and antennas 1234*a* to 1234*r*. Other operations as described above may be carried out by one or more of the described algorithms or components 1402, 1404 and/or their various subcomponents.

Each of the illustrated components 1402, 1404, and/or at least some of their various sub-components may be implemented in hardware, software executed by a processor, firmware, or any combination thereof. If implemented in software executed by a processor, the functions of the bundling configuration manager 1402, communication manager 1406 and/or at least some of their various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The bundling configuration manager 1402, communication manager 1406 and/or at least some of their various sub-components may be physically located at various positions, including being distributed such that portions of functions are implemented at different physical locations by one or more physical devices. In some examples, bundling configuration manager 1402, communication manager 1406 and/or at least some of their various sub-components may be a separate and distinct component in accordance with various aspects of the present disclosure. In other examples, bundling configuration manager 1402, communication manager 1406 and/or at least some of their various sub-components may be combined with one or more other hardware components, including but not limited to an I/O component, a transceiver, a network server, another computing device, one or more other components described in the present disclosure, or a combination thereof in accordance with various aspects of the present disclosure.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication, comprising:

a memory; and at least one processor coupled to the memory, wherein the at least one processor is configured to:

receive a plurality of bundling indicators for a plurality of downlink transmissions, wherein each bundling indicator comprises a respective bit corresponding to a respective downlink transmission of the plurality of downlink transmissions;

receive corresponding downlink assignment indicators associated with the plurality of bundling indicators, wherein each corresponding downlink assignment indicator has a respective value corresponding to a respective downlink transmission of the plurality of downlink transmissions;

determine a demodulation reference signal (DMRS) bundling configuration based on the plurality of bundling indicators and based on the corresponding downlink assignment indicators, wherein the DMRS bundling configuration indicates that DMRSs associated with a first set of bundling indicators, of the plurality of bundling indicators, are not to be handled as bundled downlink transmissions with respect to DMRSs associated with a second set of bundling indicators, of the plurality of bundling indicators, wherein the first set of bundling indicators are received after a discontinuity in the corresponding downlink assignment indicators, and wherein the second set of bundling indicators are received prior to the discontinuity; and process DMRSs according to the DMRS bundling configuration.

2. The apparatus of claim 1, wherein, to determine the DMRS bundling configuration, the at least one processor is configured to determine that, based on the plurality of bundling indicators, DMRSs associated with consecutive bundling indicators having a same value are to be handled as bundled downlink transmissions.

3. The apparatus of claim 2, wherein the at least one processor is configured to apply a same precoding scheme to the DMRSs handled as bundled downlink transmissions.

4. The apparatus of claim 2, wherein the at least one processor is configured to identify the discontinuity in the corresponding downlink assignment indicators.

5. The apparatus of claim 1, wherein, to receive the plurality of bundling indicators, the at least one processor is configured to receive the plurality of bundling indicators via control signaling; and wherein, to receive the corresponding downlink assignment indicators, the at least one processor is configured to receive the corresponding downlink assignment indicators via the control signaling.

6. The apparatus of claim 5, wherein the control signaling comprises a physical downlink control channel transmission.

7. A network entity for wireless communication, comprising:

a memory; and at least one processor coupled to the memory, wherein the at least one processor is configured to:

determine a demodulation reference signal (DMRS) bundling configuration for DMRSs of a plurality of downlink transmissions;

generate a plurality of bundling indicators to indicate the DMRS bundling configuration to a user equipment (UE), wherein each bundling indicator comprises a respective bit corresponding to a respective downlink transmission of the plurality of downlink transmissions;

transmit, to the UE, the plurality of bundling indicators and corresponding downlink assignment indicators associated with the plurality of bundling indicators, wherein each corresponding downlink assignment indicator has a respective value corresponding to a respective downlink transmission of the plurality of downlink transmissions, wherein the DMRS bundling configuration indicates that DMRSs associated with a first set of bundling indicators, of the plurality of bundling indicators, are not to be handled as bundled downlink transmissions with respect to DMRSs associated with a second set of bundling indicators, of the plurality of bundling indicators, wherein the first set of bundling indicators are transmitted after a discontinuity in the corresponding downlink assignment indicators, and wherein the second set of bundling indicators are transmitted prior to the discontinuity; and transmit the DMRSs according to the DMRS bundling configuration.

8. The network entity of claim 7, wherein downlink transmissions having DMRSs that are bundled are associated with bundling indicators having a same value and downlink transmissions having DMRSs that are not bundled are associated with bundling indicators having a different value.

9. The network entity of claim 7, wherein the at least one processor is configured to apply a same precoding scheme to the bundled DMRSs.

10. The network entity of claim 7, wherein, to transmit the plurality of bundling indicators, the at least one processor is configured to transmit the plurality of bundling indicators via control signaling.

11. The network entity of claim 10, wherein the control signaling comprises a physical downlink control channel transmission.

12. A method of wireless communication performed by an apparatus, comprising:

receiving a plurality of bundling indicators for a plurality of downlink transmissions, wherein each bundling indicator comprises a respective bit corresponding to a respective downlink transmission of the plurality of downlink transmissions;

receiving corresponding downlink assignment indicators associated with the plurality of bundling indicators, wherein each corresponding downlink assignment indicator has a respective value corresponding to a respective downlink transmission of the plurality of downlink transmissions;

determining a demodulation reference signal (DMRS) bundling configuration based on the plurality of bundling indicators and based on the corresponding downlink assignment indicators, wherein the DMRS bundling configuration indicates that DMRSs associated with a first set of bundling indicators, of the plurality of bundling indicators, are not to be handled as bundled downlink transmissions with respect to DMRSs associated with a second set of bundling indicators, of the plurality of bundling indicators, wherein the first set of bundling indicators are received after a discontinuity in the corresponding downlink assignment indicators, and wherein the second set of bundling indicators are received prior to the discontinuity; and processing DMRSs according to the DMRS bundling configuration.

13. The method of claim 12, wherein determining the DMRS bundling configuration comprises determining that, based on the plurality of bundling indicators, DMRSs associated with consecutive bundling indicators having a same value are to be handled as bundled downlink transmissions.

14. The method of claim 13, further comprising applying a same precoding scheme to the DMRSs handled as bundled downlink transmissions.

15. The method of claim 13, further comprising identifying the discontinuity in the corresponding downlink assignment indicators.

16. The method of claim 12, wherein receiving the plurality of bundling indicators comprises receiving the plurality of bundling indicators via control signaling; and wherein receiving the corresponding downlink assignment indicators comprises receiving the corresponding downlink assignment indicators via the control signaling.

17. A method of wireless communication performed by a network entity, comprising:

determining a demodulation reference signal (DMRS) bundling configuration for DMRSs of a plurality of downlink transmissions;

generating a plurality of bundling indicators to indicate the DMRS bundling configuration to a user equipment (UE), wherein each bundling indicator comprises a respective bit corresponding to a respective downlink transmission of the plurality of downlink transmissions;

transmitting, to the UE, the plurality of bundling indicators and corresponding downlink assignment indicators associated with the plurality of bundling indicators, wherein each corresponding downlink assignment indicator has a respective value corresponding to a respective downlink transmission of the plurality of downlink transmissions, wherein the DMRS bundling configuration indicates that DMRSs associated with a first set of bundling indicators, of the plurality of bundling indicators, are not to be handled as bundled downlink transmissions with respect to DMRSs associated with a second set of bundling indicators, of the plurality of bundling indicators, wherein the first set of bundling indicators are transmitted after a discontinuity in the corresponding downlink assignment indicators, and wherein the second set of bundling indicators are transmitted prior to the discontinuity; and transmitting the DMRSs according to the DMRS bundling configuration.

18. The method of claim 17, wherein downlink transmissions having DMRSs that are bundled are associated with bundling indicators having a same value and downlink transmissions having DMRSs that are not bundled are associated with bundling indicators having a different value.

19. The method of claim 17, further comprising applying a same precoding scheme to the bundled DMRSs.

20. The method of claim 17, wherein transmitting the plurality of bundling indicators comprises transmitting the plurality of bundling indicators via control signaling.

* * * * *